United States Patent
Park et al.

(10) Patent No.: US 12,035,227 B2
(45) Date of Patent: Jul. 9, 2024

(54) ELECTRONIC DEVICE MANAGING UE CAPABILITY AND METHOD FOR OPERATING THE SAME

(71) Applicant: SAMSUNG ELECTRONICS CO., LTD., Suwon-si (KR)

(72) Inventors: Jaewoo Park, Suwon-si (KR); Kwangsu Lee, Suwon-si (KR); Jaemoon Cha, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 339 days.

(21) Appl. No.: 17/573,017

(22) Filed: Jan. 11, 2022

(65) Prior Publication Data

US 2022/0256444 A1 Aug. 11, 2022

Related U.S. Application Data

(63) Continuation of application No. PCT/KR2022/000030, filed on Jan. 3, 2022.

(30) Foreign Application Priority Data

Feb. 8, 2021 (KR) .................. 10-2021-0017808

(51) Int. Cl.
*H04W 48/16* (2009.01)
*H04B 1/04* (2006.01)
(Continued)

(52) U.S. Cl.
CPC .......... *H04W 48/16* (2013.01); *H04B 1/0483* (2013.01); *H04W 28/0215* (2013.01);
(Continued)

(58) Field of Classification Search
None
See application file for complete search history.

(56) References Cited

U.S. PATENT DOCUMENTS 11,558,758 B2 * 1/2023 Prabhakar .............. H04B 17/17
2008/0114570 A1 5/2008 Li et al.
(Continued)

FOREIGN PATENT DOCUMENTS

JP 2010-273338 12/2010
JP 2019-521601 7/2019
(Continued)

OTHER PUBLICATIONS

Search Report and Written Opinion dated Apr. 7, 2022 in counterpart International Patent Application No. PCT/KR2022/000030.
(Continued)

*Primary Examiner* — Hong S Cho
(74) *Attorney, Agent, or Firm* — Nixon & Vanderhye, P.C.

(57) ABSTRACT

According to various embodiments, an electronic device may comprise: at least one antenna, a plurality of radio frequency (RF) devices configured to perform generation of a transmission RF signal input to the at least one antenna and/or conversion of a reception RF signal output from the at least one antenna, and at least one processor. The at least one processor may be configured to: detect an error in at least one RF device among the plurality of RF devices, identify at least one RF path associated with the at least one RF device with the error and at least one frequency associated with the at least one RF path, adjust a user equipment (UE) capability supported by the electronic device, by modifying and/or deleting an information element associated with the at least one frequency among at least one information element of the UE capability, based on the at least one RF path, and report the adjusted UE capability to a network.

20 Claims, 20 Drawing Sheets

(51) Int. Cl.
*H04W 28/02* (2009.01)
*H04W 72/0453* (2023.01)
*H04W 72/23* (2023.01)
*H04W 72/51* (2023.01)

(52) U.S. Cl.
CPC ....... *H04W 72/0453* (2013.01); *H04W 72/23* (2023.01); *H04W 72/51* (2023.01)

(56) References Cited

U.S. PATENT DOCUMENTS

| | | |
|---|---|---|
| 2010/0130219 A1 | 5/2010 | Cave et al. |
| 2012/0184281 A1 | 7/2012 | Kim et al. |
| 2013/0329665 A1 | 12/2013 | Kadous et al. |
| 2014/0219170 A1 | 8/2014 | Zhao et al. |
| 2016/0352611 A1 | 12/2016 | Olgaard |
| 2018/0006774 A1 | 1/2018 | Yiu et al. |
| 2018/0014301 A1 | 1/2018 | Chen et al. |
| 2019/0363843 A1 | 11/2019 | Gordaychik |
| 2019/0364567 A1 | 11/2019 | Zhang et al. |
| 2020/0029321 A1 | 1/2020 | Zhang et al. |
| 2020/0100236 A1 | 3/2020 | Tenny |
| 2020/0196233 A1 | 6/2020 | Palanisamy et al. |
| 2020/0229076 A1 | 7/2020 | Jin et al. |
| 2020/0323032 A1 | 10/2020 | Kim et al. |
| 2021/0022188 A1 | 1/2021 | Yu et al. |
| 2021/0092654 A1 | 3/2021 | Kadiri et al. |
| 2021/0392649 A1 | 12/2021 | Kim et al. |
| 2023/0038753 A1 | 2/2023 | Tan et al. |
| 2023/0337175 A1* | 10/2023 | Shi .......................... H04W 8/24 |
| 2024/0007843 A1* | 1/2024 | Shen ....................... H04W 8/22 |

FOREIGN PATENT DOCUMENTS

| | | |
|---|---|---|
| KR | 10-2008-0037668 | 4/2008 |
| KR | 10-2012-0083870 | 7/2012 |
| KR | 10-2014-0058610 | 5/2014 |
| KR | 10-2019-0026060 | 3/2019 |
| KR | 10-2019-0057112 | 5/2019 |
| KR | 10-2019-0103241 | 9/2019 |
| KR | 10-2020-0086535 | 7/2020 |
| KR | 10-2020-0088667 | 7/2020 |
| KR | 10-2020-0106702 | 9/2020 |
| KR | 10-2020-0117847 | 10/2020 |
| KR | 10-2020-0121176 | 10/2020 |
| KR | 10-2020-0123594 | 10/2020 |
| KR | 10-2022-0016084 | 2/2022 |
| KR | 10-2022-0130193 | 9/2022 |
| WO | 2020/105969 | 12/2021 |

OTHER PUBLICATIONS

Extended European Search Report dated Feb. 6, 2024 issued in European Patent Application No. 22749867.2.

\* cited by examiner

ELECTRONIC DEVICE MANAGING UE CAPABILITY AND METHOD FOR OPERATING THE SAME

CROSS-REFERENCE TO RELATED APPLICATIONS

This application is a continuation of International Application No. PCT/KR2022/000030 designating the United States, filed on Jan. 3, 2022, in the Korean Intellectual Property Receiving Office and claiming priority to Korean Patent Application No. 10-2021-0017808, filed on Feb. 8, 2021, in the Korean Intellectual Property Office, the disclosures or which are incorporated by reference herein in their entireties.

BACKGROUND

Field

The disclosure relates to an electronic device managing UE capability and a method for operating the same.

Description of Related Art

As mobile communication technology evolves, multi-functional portable terminals are commonplace and, to meet increasing demand for radio traffic, vigorous efforts are underway to develop 5G communication systems. To achieve a higher data transmission rate, 5G communication systems are being implemented on higher frequency bands (e.g., an mmWave band or a band of 25 GHz to 60 GHz) as well as those used for 3G communication systems and long-term evolution (LTE) communication systems.

For example, to mitigate path loss on the mmWave band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

To perform the above-described communication, the electronic device may include a communication module. The electronic device may transmit data to a base station and/or another electronic device through the communication module and may receive data from the base station and/or the other electronic device. The communication module of the electronic device may include at least one transmission module and/or reception module. For example, an electronic device supporting 5G uses a transmission/reception module for a sub6 (FR1) frequency band and a transmission/reception module for an mmWave (FR2) frequency band.

An error may occur in the transmit RF path and/or the receive RF path of the electronic device. For example, an error in the transmit RF path may refer to an error in at least some of at least one RF device for conversion of the baseband signal into an RF signal for transmission and/or radiation of an electromagnetic wave corresponding to the RF signal. For example, an error in the receive RF path may refer to an error in at least some of at least one RF device for conversion the electromagnetic wave into an RF signal and/or for conversion of the RF signal to a baseband signal. The conventional electronic device may operate in offline mode when an error occurs in the transmit RF path and/or the receive RF path. The conventional electronic device operates in offline mode despite the presence of an RF path in which no error occurs.

SUMMARY

Embodiments of the disclosure may provide an electronic device and an operation method thereof that may perform communication based on an RF path in which no error (or fewer errors) occurs by adjusting UE capability based on an RF path in which an error occurs.

According to various example embodiments, an electronic device may comprise: at least one antenna, a plurality of radio frequency (RF) devices comprising RF circuitry configured to perform generation of a transmission RF signal input to the at least one antenna and/or conversion of a reception RF signal output from the at least one antenna, and at least one processor. The at least one processor may be configured to: detect an error in at least one RF device among the plurality of RF devices, identify at least one RF path associated with the at least one RF device with the error and at least one frequency associated with the at least one RF path, adjust a UE (user equipment) capability supported by the electronic device by modifying and/or deleting an information element associated with the at least one frequency among at least one information element of the UE capability based on the at least one RF path, and report the adjusted UE capability to a network.

According to various example embodiments, a method of operating an electronic device including at least one antenna and a plurality of radio frequency (RF) devices comprising radio frequency circuitry configured to perform generation of a transmission RF signal input to the at least one antenna and/or conversion of a reception RF signal output from the at least one antenna may comprise: detecting an error in at least one RF device among the plurality of RF devices, identifying at least one RF path associated with the at least one RF device with the error and at least one frequency associated with the at least one RF path, adjusting a UE capability supported by the electronic device by modifying and/or deleting an information element associated with the at least one frequency among at least one information element of the UE capability based on the at least one RF path, and reporting the adjusted UE capability to a network.

According to various example embodiments, a method of operating a base station may comprise: receiving, from an electronic device, a first UE capability configured based on no error occurring in at least one RF device included in the electronic device, transmitting, to the electronic device, a first radio resource control (RRC) reconfiguration message including first configuration information corresponding to the first UE capability, receiving, from the electronic device, a second UE capability configured based on an error occurring in at least some of the at least one RF device included in the electronic device, and transmitting, to the electronic device, a second RRC reconfiguration message including second configuration information corresponding to the second UE capability.

According to various example embodiments, there may be provided an electronic device and an operation method thereof which perform communication based on an RF path in which no error occurs by adjusting UE capability based on an RF path in which an error occurs. Accordingly, the electronic device may operate in an online mode even when a specific RF path fails.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
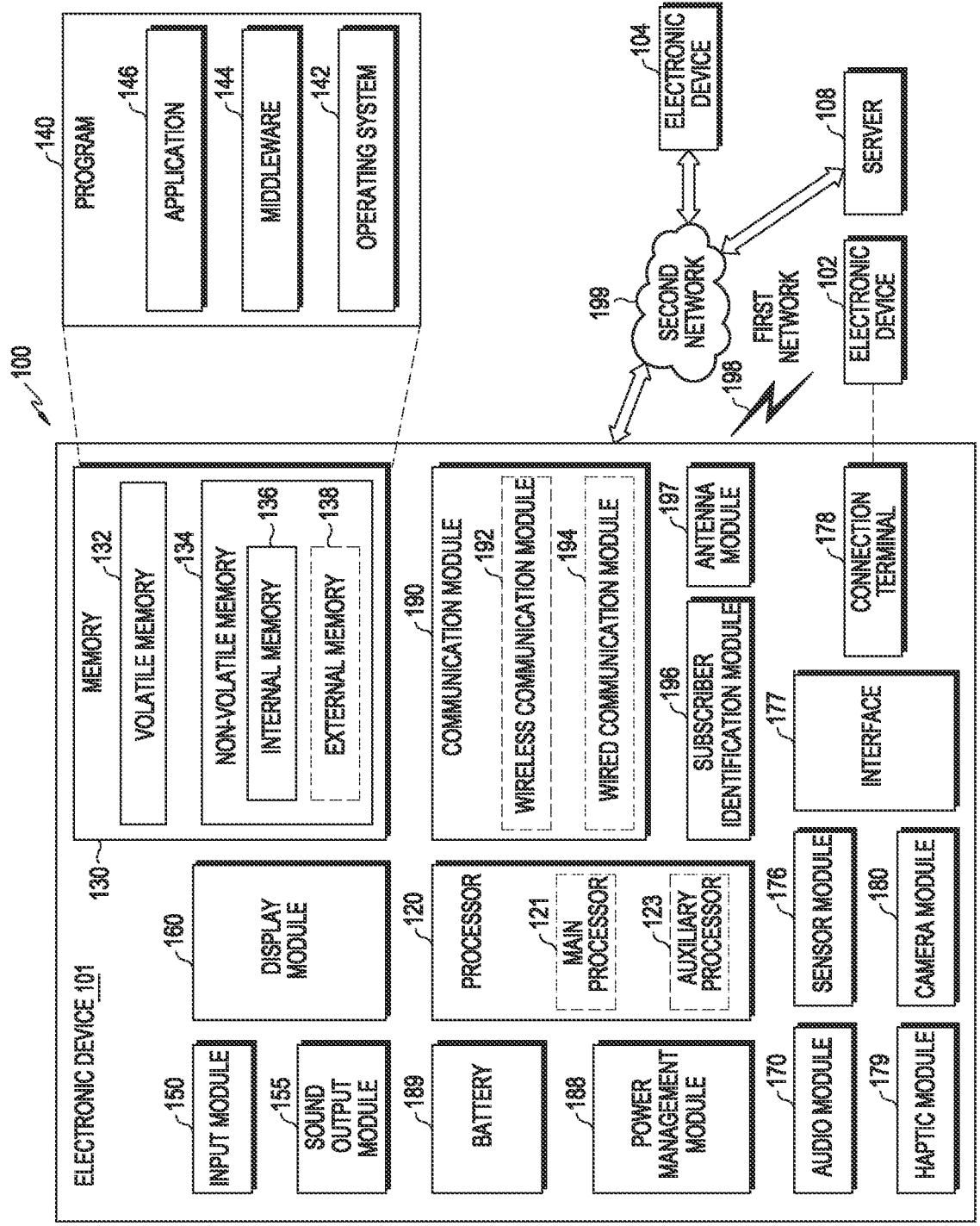
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a communication module 192 (e.g., a cellular communication module, a short-range communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The communication module 192 may identify or authenticate the electronic device 101 in a communication network, such as the first network 198 or the second network 199, using subscriber information (e.g., international mobile subscriber identity (IMSI)) stored in the subscriber identification module 196.

The communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The communication module 192 may support a high-frequency band (e.g., the mmWave band) to achieve, e.g., a high data transmission rate. The communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The communication module 192 may support various requirements specified in the electronic device 101, an external electronic device (e.g., the electronic device 104), or a network system (e.g., the second network 199). According to an embodiment, the communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2A:
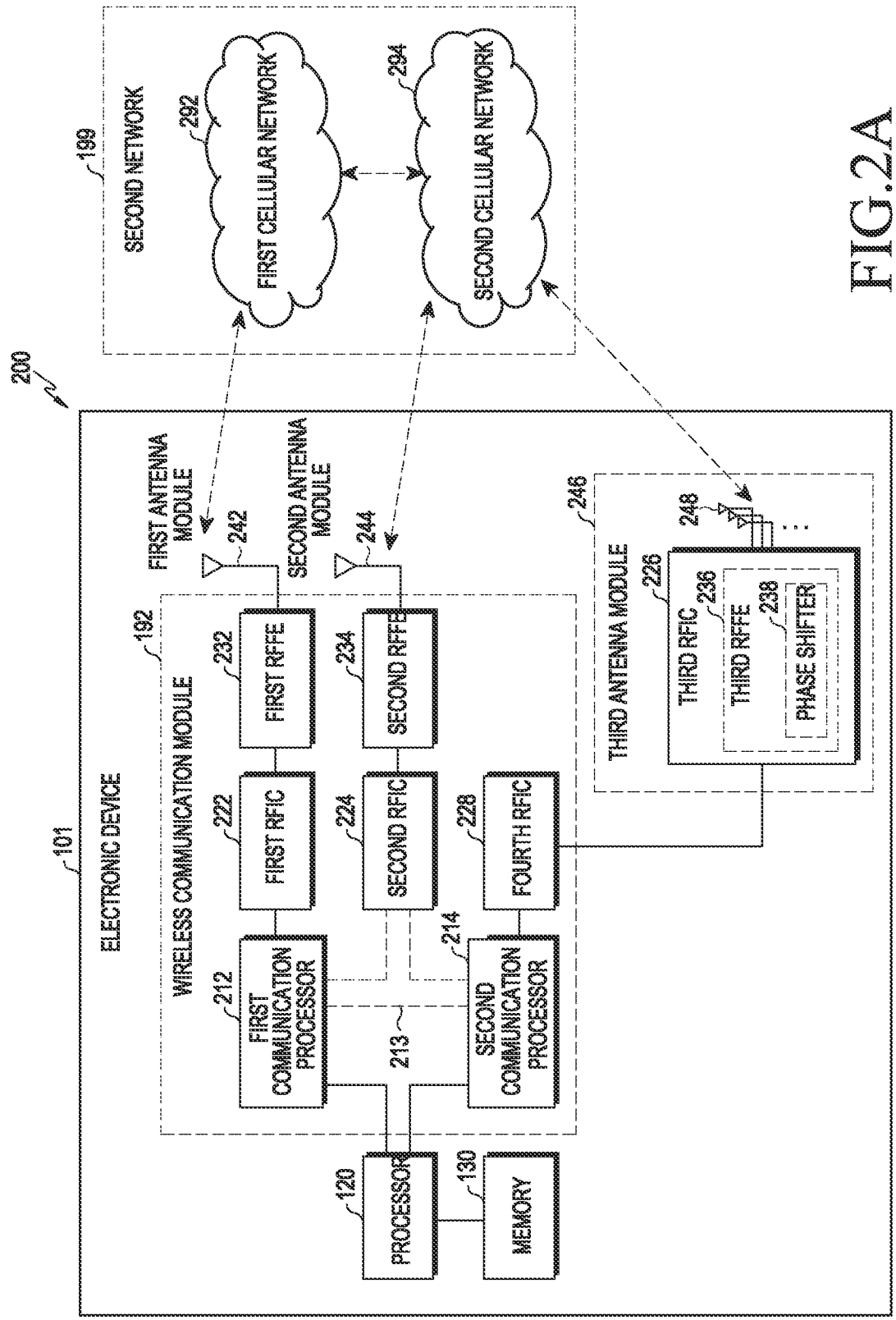
FIGS. 2A and 2B are block diagrams illustrating an example configuration of an electronic device for supporting legacy network communication and 5G network communication according to various embodiments.

FIG. 2A is a block diagram 200 illustrating an example configuration of an electronic device 101 for supporting legacy network communication and 5G network communication according to various embodiments. Referring to FIG. 2A, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device 101 may further include a processor (e.g., including processing circuitry) 120 and a memory 130. The second network 199 may include a first cellular network 292 and a second cellular network 294. According to an embodiment, the electronic device 101 may further include at least one component among the components of FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least part of the communication module 192. According to an embodiment, the fourth RFIC 228 may be omitted or be included as part of the third RFIC 226.

The first communication processor 212 may establish a communication channel of a band that is to be used for wireless communication with the first cellular network 292 or may support legacy network communication via the established communication channel According to various embodiments, the first cellular network may be a legacy network that includes second generation (2G), third generation (3G), fourth generation (4G), or long-term evolution (LTE) networks. The second CP 214 may establish a communication channel corresponding to a designated band (e.g., from about 6 GHz to about 60 GHz) among bands that are to be used for wireless communication with the second cellular network 294 or may support fifth generation (5G) network communication via the established communication channel. According to an embodiment, the second cellular network 294 may be a 5G network defined by the 3rd generation partnership project (3GPP). Additionally, according to an embodiment, the first CP 212 or the second CP 214 may establish a communication channel corresponding to another designated band (e.g., about 6 GHz or less) among the bands that are to be used for wireless communication with the second cellular network 294 or may support fifth generation (5G) network communication via the established communication channel.

The first communication processor 212 may perform data transmission/reception with the second communication processor 214. For example, data classified as transmitted via the second cellular network 294 may be changed to be transmitted via the first cellular network 292. In this case, the first communication processor 212 may receive transmission data from the second communication processor 214. For example, the first communication processor 212 may transmit/receive data to/from the second communication processor 214 via an inter-processor interface 213. The inter-processor interface 213 may be implemented as, e.g., universal asynchronous receiver/transmitter (UART) (e.g., high speed-UART (HS-UART)) or peripheral component interconnect bus express (PCIe) interface, but is not limited to a specific kind. The first communication processor 212 and the second communication processor 214 may exchange packet data information and control information using, e.g., a shared memory. The first communication processor 212 may transmit/receive various pieces of information, such as sensing information, output strength information, or resource block (RB) allocation information, to/from the second communication processor 214.

According to implementation, the first communication processor 212 may not be directly connected with the second communication processor 214. In this case, the first communication processor 212 may transmit/receive data to/from the second communication processor 214 via a processor 120 (e.g., an application processor). For example, the first communication processor 212 and the second communication processor 214 may transmit/receive data to/from the processor 120 (e.g., an application processor) via an HS-UART interface or PCIe interface, but the kind of the interface is not limited thereto. The first communication processor 212 and the second communication processor 214 may exchange control information and packet data information with the processor 120 (e.g., an application processor) using a shared memory.

Figure 2B:
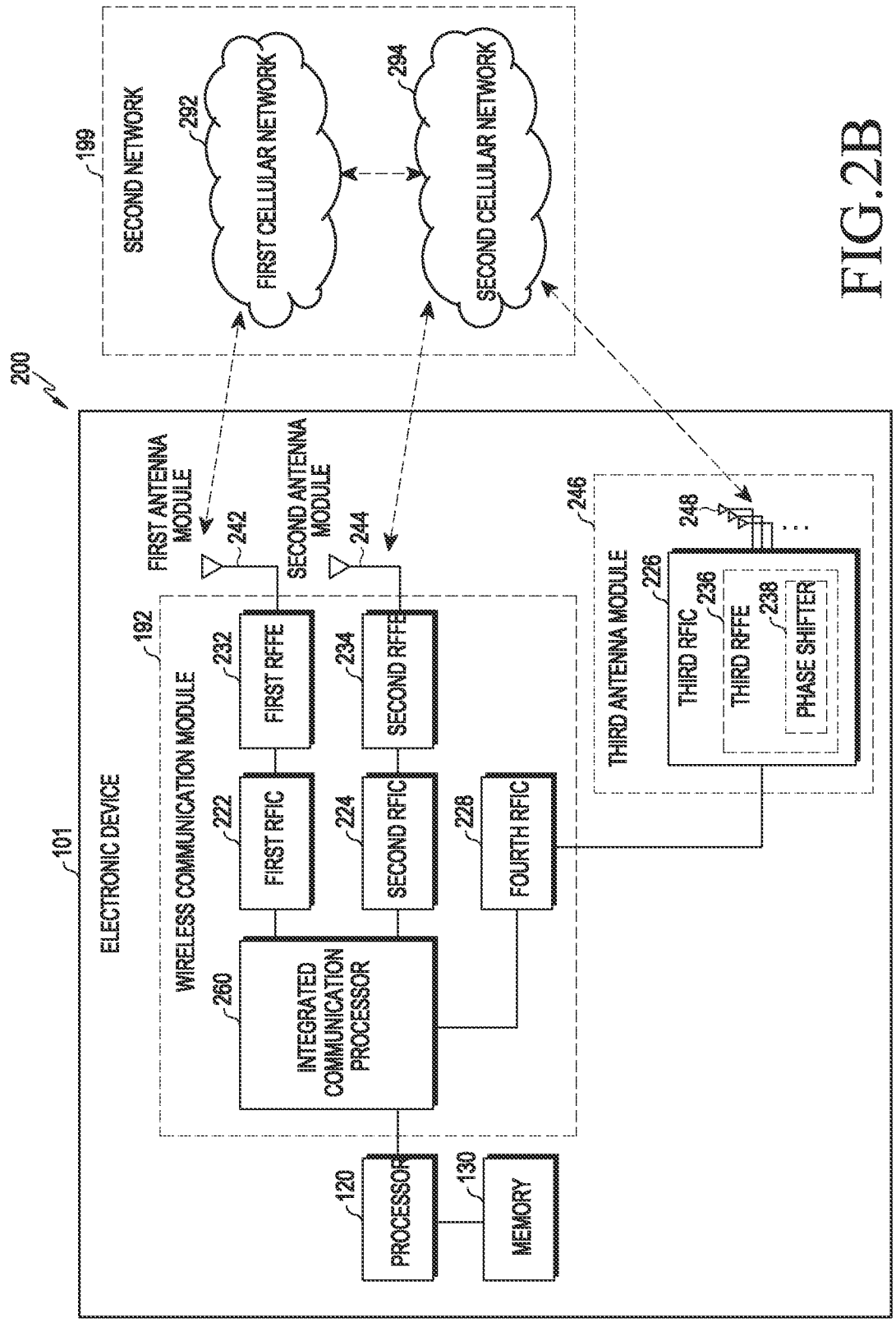

According to an embodiment, the first communication processor 212 and the second communication processor 214 may be implemented in a single chip or a single package. According to an embodiment, the first communication processor 212 or the second communication processor 214, along with the processor 120, an assistance processor 123, or communication module 190, may be formed in a single chip or single package. For example, as shown in FIG. 2B, an integrated communication processor (e.g., including processing circuitry) 260 may support all of the functions for communication with the first cellular network 292 and the second cellular network 294.

Upon transmission, the first RFIC 222 may convert a baseband signal generated by the first communication processor 212 into a radio frequency (RF) signal with a frequency ranging from about 700 MHz to about 3 GHz which is used by the first cellular network 292 (e.g., a legacy network). Upon receipt, the RF signal may be obtained from the first network 292 (e.g., a legacy network) through an antenna (e.g., the first antenna module 242) and be pre-processed via an RFFE (e.g., the first RFFE 232). The first RFIC 222 may convert the pre-processed RF signal into a baseband signal that may be processed by the first communication processor 212.

Upon transmission, the second RFIC 224 may convert the baseband signal generated by the first communication processor 212 or the second communication processor 214 into a Sub6-band (e.g., about 6 GHz or less) RF signal (hereinafter, "5G Sub6 RF signal") that is used by the second cellular network 294 (e.g., a 5G network). Upon receipt, the 5G Sub6 RF signal may be obtained from the second cellular network 294 (e.g., a 5G network) through an antenna (e.g., the second antenna module 244) and be pre-processed via an RFFE (e.g., the second RFFE 234). The second RFIC 224 may convert the pre-processed 5G Sub6 RF signal into a baseband signal that may be processed by a corresponding processor of the first communication processor 212 and the second communication processor 214.

The third RFIC 226 may convert the baseband signal generated by the second communication processor 214 into a 5G Above6 band (e.g., about 6 GHz to about 60 GHz) RF signal (hereinafter, "5G Above6 RF signal") that is to be used by the second cellular network 294 (e.g., a 5G network). Upon receipt, the 5G Above6 RF signal may be obtained from the second cellular network 294 (e.g., a 5G network) through an antenna (e.g., the antenna 248) and be pre-processed via the third RFFE 236. The third RFIC 226 may convert the pre-processed 5G Above6 RF signal into a baseband signal that may be processed by the second communication processor 214. According to an embodiment, the third RFFE 236 may be formed as part of the third RFIC 226.

According to an embodiment, the electronic device 101 may include the fourth RFIC 228 separately from, or as at least part of, the third RFIC 226. In this case, the fourth RFIC 228 may convert the baseband signal generated by the second communication processor 214 into an intermediate frequency band (e.g., from about 9 GHz to about 11 GHz) RF signal (hereinafter, "IF signal") and transfer the IF signal to the third RFIC 226. The third RFIC 226 may convert the IF signal into a 5G Above6 RF signal. Upon receipt, the 5G Above6 RF signal may be received from the second cellular network 294 (e.g., a 5G network) through an antenna (e.g., the antenna 248) and be converted into an IF signal by the third RFIC 226. The fourth RFIC 228 may convert the IF signal into a baseband signal that may be processed by the second communication processor 214.

According to an embodiment, the first RFIC 222 and the second RFIC 224 may be implemented as at least part of a single chip or single package. According to various embodiments, when the first RFIC 222 and the second RFIC 224 in FIG. 2A or 2B are implemented as a single chip or a single package, they may be implemented as an integrated RFIC. In this case, the integrated RFIC is connected to the first RFFE 232 and the second RFFE 234 to convert a baseband signal into a signal of a band supported by the first RFFE 232 and/or the second RFFE 234, and may transmit the converted signal to one of the first RFFE 232 and the second RFFE 234. According to an embodiment, the first RFFE 232 and the second RFFE 234 may be implemented as at least part of a single chip or single package. According to an embodiment, at least one of the first antenna module 242 or the second antenna module 244 may be omitted or be combined with another antenna module to process multi-band RF signals.

According to an embodiment, the third RFIC 226 and the antenna 248 may be disposed on the same substrate to form the third antenna module 246. For example, the communication module 192 or the processor 120 may be disposed on a first substrate (e.g., a main painted circuit board (PCB)). In this case, the third RFIC 226 and the antenna 248, respectively, may be disposed on one area (e.g., the bottom) and another (e.g., the top) of a second substrate (e.g., a sub PCB) which is provided separately from the first substrate, forming the third antenna module 246. Placing the third RFIC 226 and the antenna 248 on the same substrate may shorten the length of the transmission line therebetween. This may reduce a loss (e.g., attenuation) of high-frequency band (e.g., from about 6 GHz to about 60 GHz) signal used for 5G network communication due to the transmission line. Thus, the electronic device 101 may enhance the communication quality with the second network 294 (e.g., a 5G network).

According to an embodiment, the antenna 248 may be formed as an antenna array which includes a plurality of antenna elements available for beamforming. In this case, the third RFIC 226 may include a plurality of phase shifters 238 corresponding to the plurality of antenna elements, as part of the third RFFE 236. Upon transmission, the plurality of phase shifters 238 may change the phase of the 5G Above6 RF signal which is to be transmitted to the outside (e.g., a 5G network base station) of the electronic device 101 via their respective corresponding antenna elements. Upon receipt, the plurality of phase shifters 238 may change the phase of the 5G Above6 RF signal received from the outside to the same or substantially the same phase via their respective corresponding antenna elements. This enables transmission or reception via beamforming between the electronic device 101 and the outside.

The second cellular network 294 (e.g., a 5G network) may be operated independently (e.g., as standalone (SA)) from, or in connection (e.g., as non-standalone (NSA)) with the first cellular network 292 (e.g., a legacy network). For example, the 5G network may include access networks (e.g., 5G access networks (RANs)) but lack any core network (e.g., a next-generation core (NGC)). In this case, the electronic device 101, after accessing a 5G network access network, may access an external network (e.g., the Internet) under the control of the core network (e.g., the evolved packet core (EPC)) of the legacy network. Protocol information (e.g., LTE protocol information) for communication with the legacy network or protocol information (e.g., New Radio (NR) protocol information) for communication with the 5G network may be stored in the memory 230 and be accessed by other components (e.g., the processor 120, the first communication processor 212, or the second communication processor 214).

Figure 3A:
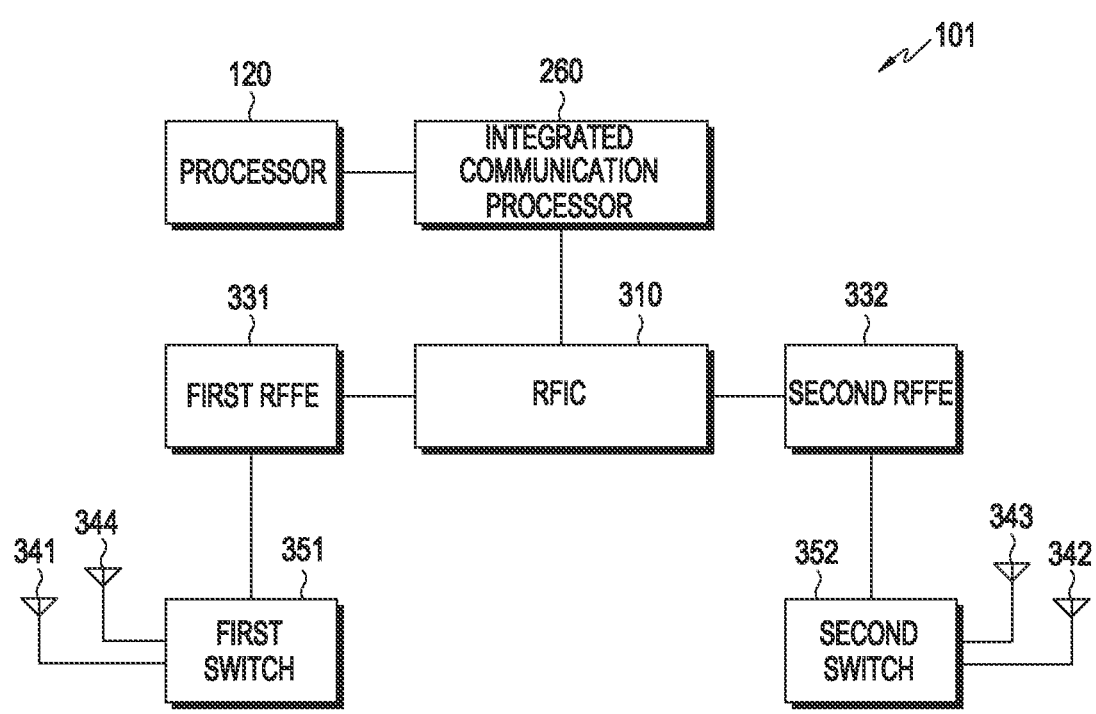
FIG. 3A is a block diagram illustrating an example configuration of an electronic device according to various embodiments.
Figure 3B:
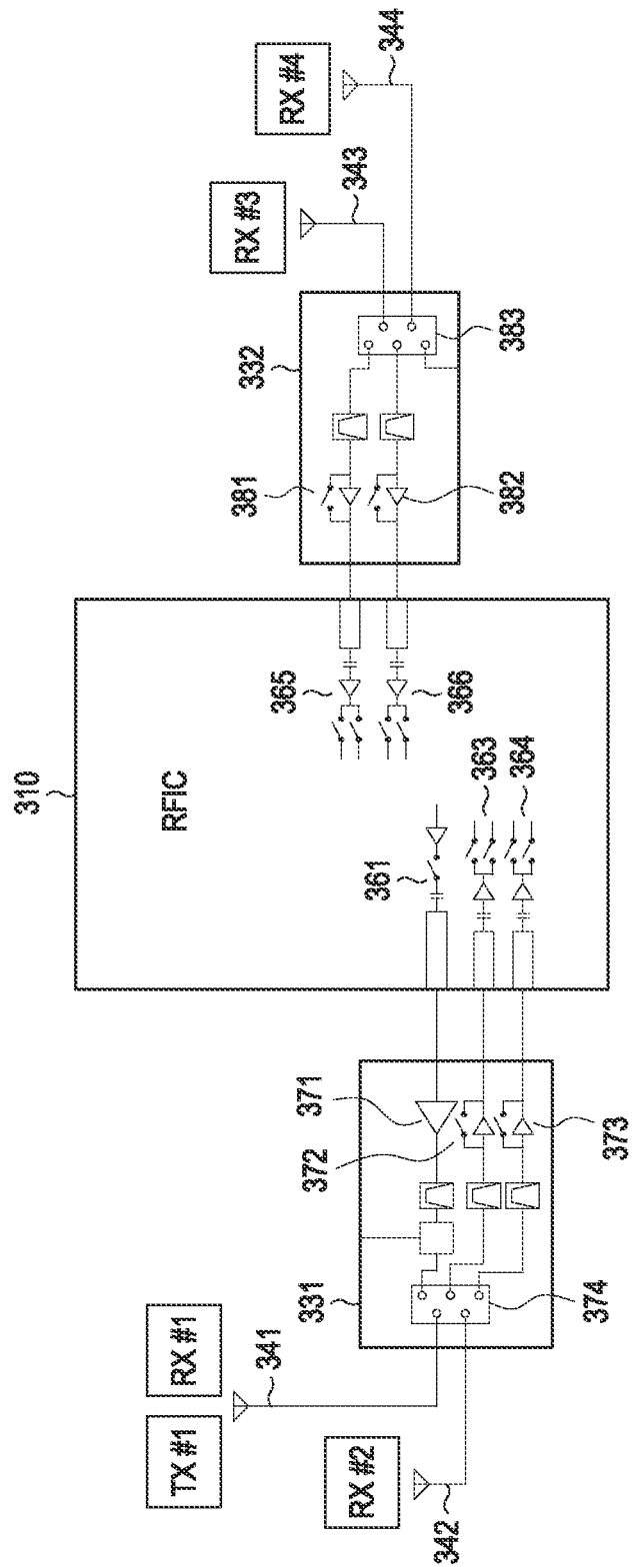
FIG. 3B is a diagram illustrating an example transmit RF path and an example receive RF path according to various embodiments.

FIG. 3A is a block diagram illustrating an example configuration of an electronic device according to various embodiments. The embodiment of FIG. 3A is described with reference to FIG. 3B. FIG. 3B is a diagram illustrating an example transmit RF path and a receive RF path according to various embodiments.

Referring to FIG. 3A, according to various embodiments, an electronic device (e.g., the electronic device 101 of FIG. 1) may include a processor (e.g., including processing circuitry) 120, an integrated communication processor (e.g., including processing circuitry) 260, an RFIC 310, a first RFFE 331, a second RFEE 332, a first antenna 341, a second antenna 342, a third antenna 343, a fourth antenna 344, a first switch 351, and/or a second switch 352.

According to various embodiments, upon transmission, the RFIC 310 may convert a baseband signal generated by the integrated communication processor 260 into a radio frequency (RF) signal used in the first communication network or the second communication network. For example, the RFIC 310 may transmit an RF signal used in the first communication network to the first antenna 341 or the fourth antenna 344 through the first RFFE 331 and the first switch 351. The RFIC 310 may transmits an RF signal used in the first communication network or the second communication network to the second antenna 342 or the third antenna 343 through the second RFFE 332 and the second switch 352. According to various embodiments, the RFIC 310 may transmit an RF signal corresponding to the first communication network to the first antenna 341 or the fourth antenna 344 through the first RFFE 331 and may transmit an RF signal corresponding to the second communication network to the second antenna 342 or the third antenna 343 through the second RFFE 332. Upon reception, the RFIC 310 may convert the RF signal received from an RFFE (e.g., the first RFFE 331 or the second RFFE 332) into a baseband signal and provide it to the integrated communication processor 260.

According to various embodiments, a transmit RF path and a receive RF path may be defined based on an RFIC, an RFFE, and/or a switch. For example, referring to FIG. 3B, the RFIC 310 may include components 361 for transmission and components 363, 364, 365 and 366 for reception. The first RFFE 331 may include components 371 for transmission, components 372 and 373 for reception, and a switch 374. In FIG. 3A, the switch 351 may be implemented as disposed outside the first RFFE 331 but, as shown in FIG. 3B, the switch 374 may be included in the first RFFE 331. The switch 374 may control the connection between each of the components 371, 372, and 373 and each of the antennas 341 and 342. For example, conversion of a baseband signal into an RF signal and/or radiation of an RF signal-based electromagnetic wave may be performed based on at least one of the component 361 for transmission, the component 371 for transmission, the switch 374, or the first antenna 341, which may be referred to as a first transmit RF path TX #1. For example, output of an electromagnetic wave-based RF signal and/or conversion of an RF signal into a baseband signal may be performed based on at least one of the component 363 for reception, the component 372 for reception, the switch 374, or the first antenna 341, which may be referred to as a first receive RF path RX #1. For example, output of an electromagnetic wave-based RF signal and/or conversion of an RF signal into a baseband signal may be performed based on at least one of the component 364 for reception, the component 373 for reception, the switch 374, or the second antenna 342, which may be referred to as a second receive RF path RX #2.

According to various embodiments, the second RFFE 332 may include components 381 and 382 and a switch 383 for reception. In FIG. 3A, the switch 352 may be implemented as disposed outside the second RFFE 332 but, as shown in FIG. 3B, the switch 383 may be included in the second RFFE 332. The switch 383 may control the connection between each of the components 381 and 382 and each of the antennas 343 and 344. For example, output of an electromagnetic wave-based RF signal and/or conversion of an RF signal into a baseband signal may be performed based on at least one of the component 365 for reception, the component 381 for reception, the switch 383, or the third antenna 343, which may be referred to as a third receive RF path RX #3. For example, output of an electromagnetic wave-based RF signal and/or conversion of an RF signal into a baseband signal may be performed based on at least one of the component 366 for reception, the component 382 for reception, the switch 383, or the fourth antenna 344, which may be referred to as a fourth receive RF path RX #4.

As described above, corresponding to the RFIC 310, the first transmit RF path TX #1, the first receive RF path RX #1, the second receive RF path RX #2, the third receive RF path RX #3, and the fourth receive RF path RX #4 may be defined in the electronic device 101, corresponding to the RFIC 310. Meanwhile, although not shown, the electronic device 101 may be implemented such that an additional transmit RF path is further formed in the RFIC 310. Alternatively, although not shown, the electronic device 101 may be implemented to further include an additional RFIC in addition to the RFIC 310. Accordingly, there is no limit to the number of transmit RF paths and/or receive RF paths provided in the electronic device 101.

In various embodiments, when an error is detected from a specific RF device, the electronic device 101 may identify an RF path and/or a frequency (or frequency band) corresponding to the RF device. It will be understood by one of ordinary skill in the art that, in various embodiments of the disclosure, frequency (e.g., center frequency) and frequency band may be used interchangeably. According to various embodiments, the electronic device 101 may store association information between an RF path (e.g., a transmit RF path and/or a receive RF path) and a frequency (or frequency band) used in the corresponding RF path. The association information may be referred to as, e.g., RF setting information, but is not limited thereto. Table 1 is an example of the association information.

TABLE 1

| RF path identification information | TX#1 | RX#1 | RX#2 | RX#3 | RX#4 |
|---|---|---|---|---|---|
| Type | TX | RX | RX | RX | RX |
| frequency band | B48 | B48 | B48 | B48 | B48 |

In Table 1, RF paths are reflected as supporting one frequency band (e.g., B48), but this is merely an example and one RF path may be configured to support multiple frequency bands. As described above, in various embodiments of the disclosure, frequency band and frequency may be used interchangeably. The frequency bands in Table 1 may also be implemented to be replaced with frequencies (e.g., center frequency). Further, the association information may further include identification information about at least one component associated with the corresponding RF path. Accordingly, the electronic device 101 may identify an RF path and a frequency (or frequency band) corresponding to the corresponding component by detecting an error in the specific component. As is described below, the electronic device 101 may delete and/or modify an information element of UE capability associated with the identified frequency (or frequency band).

Meanwhile, in an embodiment, the electronic device 101 may store association information between components and a frequency (or frequency band) used by the components without information about the RF path. For example, if an occurrence of an error from a specific component is detected, the electronic device 101 may identify a frequency (or frequency band) corresponding to the specific component. As is described below, the electronic device 101 may delete and/or modify an information element of UE capability associated with the identified frequency (or frequency band). In various embodiments of the disclosure, it will be appreciated by one of ordinary skill in the art that the configuration in which the electronic device 101 performs a specific operation using an RF path and a frequency (or frequency band) may be replaced with a configuration of performing the specific operation using information and frequency (or frequency band) for identifying a component.

Figure 4:
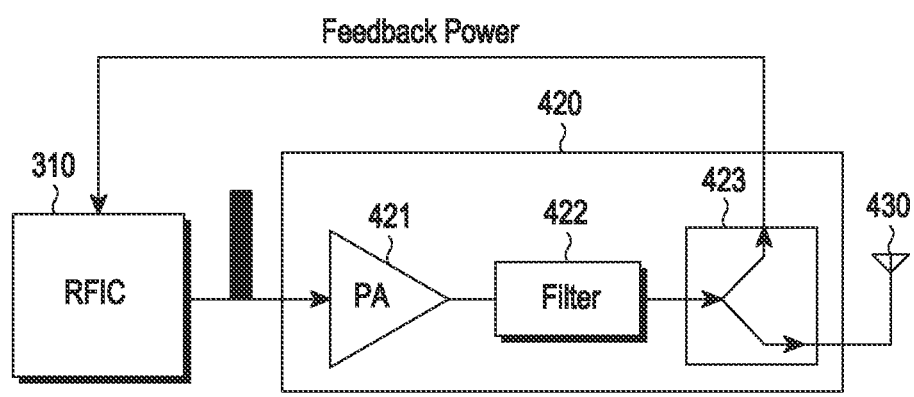
FIG. 4 is a block diagram illustrating an example configuration of an electronic device according to various embodiments.

FIG. 4 is a block diagram illustrating an example configuration of an electronic device according to various embodiments.

According to various embodiments, an RFIC 310 of an electronic device 101 may provide an RF signal to an RFFE 420 (e.g., the first RFFE 331 of FIG. 3A). The RFFE 420 may process (e.g., amplify and/or filter) the received RF signal and apply it to the antenna 430. The antenna 430 may emit an electromagnetic wave based on the received RF signal. In the example of FIG. 4, it is assumed that an error has occurred in the RFFE 420. The RFFE 420 may include a power amplifier (PA) 421 for transmission, a filter 422, and a coupler 423. The amplifier 421 may amplify and output the received RF signal. The filter 422 may filter a frequency band of a designated range. The coupler 423 may provide a portion of the received power, as feedback power, to the RFIC 310 and the rest to the antenna 430. The RFIC 310 may adjust the amplification degree of the power amplifier 421 according to the received feedback power. If the RFFE 420 in which an error occurs is used, the amplified RF signal output from the power amplifier 421 may be reflected, and the reflected RF signal may damage the power amplifier 421. Accordingly, there is a possibility that components including the power amplifier 421 may be damaged and generate heat. According to various embodiments, the electronic device 101 may perform communication through the remaining RF paths except for the RF path in which an error occurs and may delete and/or adjust an information element of UE capability associated with the frequency (or frequency band) supported by the corresponding RF path.

Figure 5:
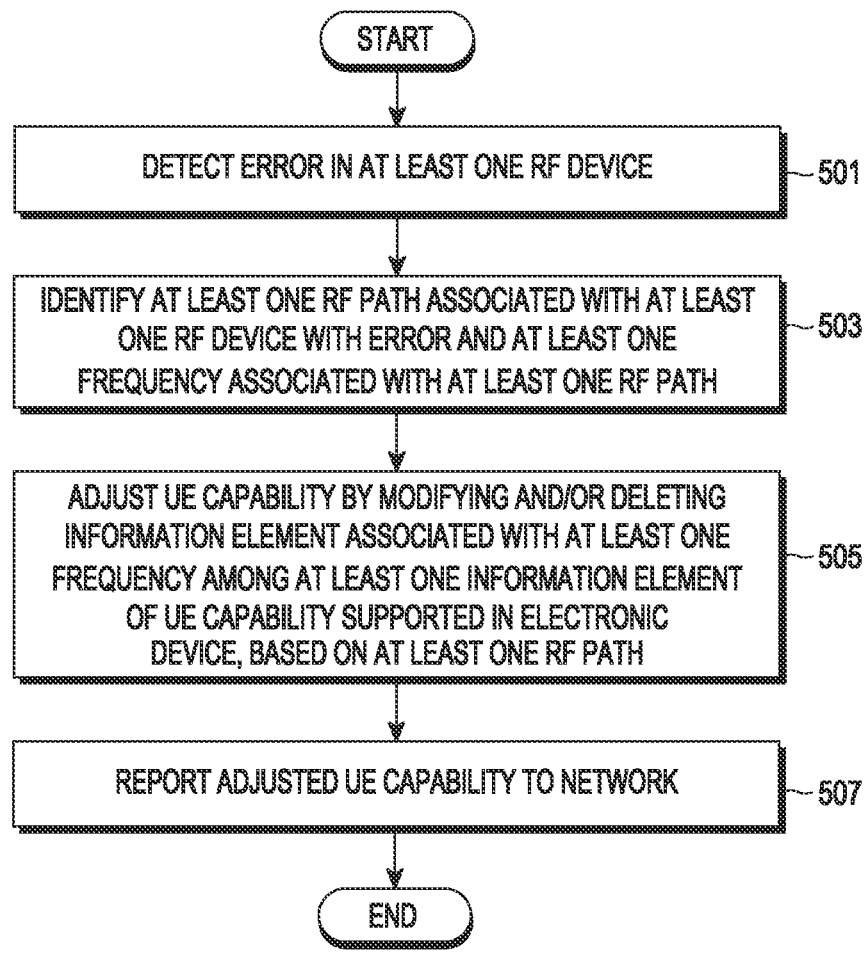
FIG. 5 is a flowchart illustrating an example method of operating an electronic device according to various embodiments.

FIG. 5 is a flowchart illustrating an example method of operating an electronic device according to various embodiments.

According to various embodiments, the electronic device 101 (e.g., at least one of the processor 120 of FIG. 1, 2A, or 2B, the first communication processor 212 of FIG. 2A, the second communication processor 214 of FIG. 2A, or the integrated communication processor 260 of FIG. 2B) may detect an error in at least one RF device in operation 501. In one example, the electronic device 101 may perform communication through an interface with each of at least one RF device at (or after) a booting time and may detect errors based on communication. As another example, the electronic device 101 may compare the transmission power corresponding to a specific signal (e.g., a channel) with the output power actually measured at the antenna port and may detect an error based on a result of the comparison. Various error detection methods of the electronic device 101 are described below.

According to various embodiments, in operation 503, the electronic device 101 may identify at least one RF path associated with at least one RF device where an error occurs and at least one frequency (or frequency band) associated with at least one RF path. In various embodiments, "RF path" may refer to a receive RF path and/or a transmit RF path. For example, the electronic device 101 may identify at least one RF path including at least one RF device in which an error occurs. The electronic device 101 may store association information about a plurality of RF paths and supported frequencies (or frequency bands) as shown in Table 1. The electronic device 101 may identify the frequency (or frequency band) supported by the identified at least one RF path using the association information.

According to various embodiments, in operation 505, the electronic device 101 may adjust the UE capability by modifying and/or deleting the information element associated with at least one frequency (or frequency band) among at least one information element of the UE capability supported by the electronic device, based on at least one RF path. In an example, when there is no other RF path supporting a first frequency (or a first frequency band corresponding to the first frequency) other than at least one RF path, the electronic device 101 may delete and/or adjust the information element of the UE capability associated with the first frequency (or first frequency band). For example, the electronic device 101 may delete the first frequency band of the first frequency among frequency bands supported among the information elements of the UE capability. As another example, the electronic device 101 may adjust the frequency band combination including the frequency band of the first frequency not to include the first frequency band or delete the frequency band combination including the first frequency band. As another example, the electronic device 101 may adjust the number of layers of the first frequency (or first frequency band). As another example, the electronic device 101 may adjust the SRS parameter of the first frequency (or first frequency band). Modification and/or deletion of an information element of the UE capability according to each example, by the electronic device 101, is described below.

According to various embodiments, in operation 507, the electronic device 101 may report the adjusted UE capability to the network. The electronic device 101 may perform communication using a path other than the at least one RF path determined to have an error. For example, the electronic device 101 may scan the synchronization signal from the cell, in the remaining frequencies except for the at least one frequency corresponding to the at least one RF path where an error occurs. The electronic device 101 may perform cell selection based on the received strength of the synchronization signal and form a radio resource control (RRC) connection. The electronic device 101 may perform an attach procedure according to EPC or a registration procedure according to 5GC. The attach procedure according to EPC or registration procedure according to 5GC may be performed. The electronic device 101 may report the adjusted UE capability to the network during the attach procedure or the registration procedure. Accordingly, the network may operate based on the adjusted UE capability. It is assumed that the UE capability whose information element for the first (or the first frequency band) has been adjusted is transmitted to the network. For example, even when there is a neighbor cell supporting the first frequency (or first frequency band), the network may transmit an RRC connection reestablish message including a measurement object (MO) not including the first frequency (or first frequency band) to the electronic device 101. For example, upon transmitting an RRC connection reestablish message for CA to the electronic device 101, the network may not include the first frequency (or first frequency band) in the CA band combination. For example, the network may not include the first frequency (or the first frequency band) in the MO even when configuring an MO for a second cell group (SCG) of dual-connectivity (DC). Accordingly, not only does the electronic device 101 not use the erroneous RF path, but also the network may not require an operation associated with the erroneous RF path of the electronic device 101.

Meanwhile, as described above, in an embodiment, the electronic device 101 may not determine at least one RF path. For example, the electronic device 101 may identify the erroneous RF device and may identify the frequency (or frequency band) corresponding to the corresponding RF device. The electronic device 101 may adjust the UE capability by deleting and/or modifying the information element of the UE capability associated with the identified frequency (or frequency band).

According to various embodiments, the electronic device 101 may output a message indicating the occurrence of the error.

Figure 6:
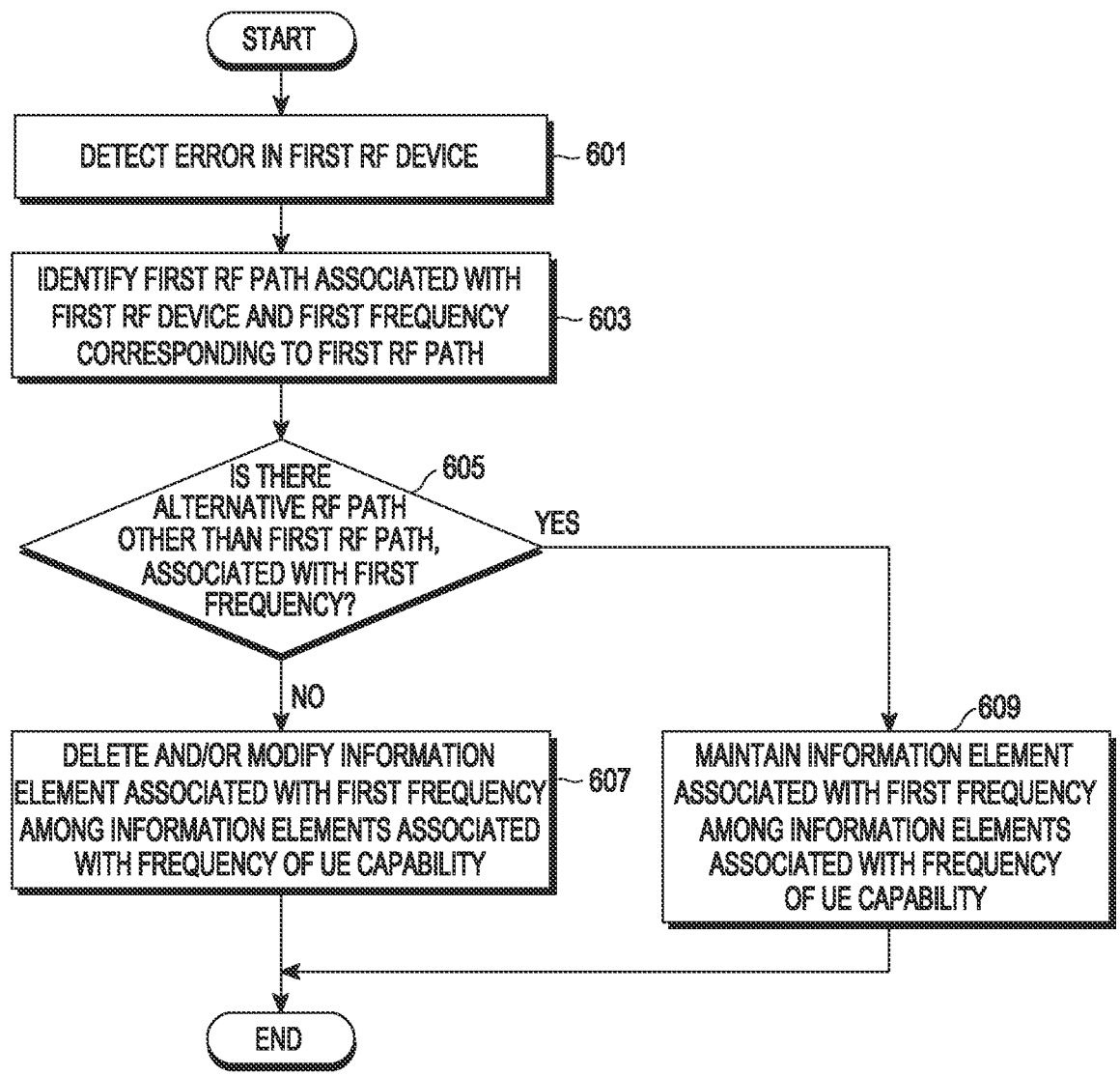
FIG. 6 is a flowchart illustrating an example method of operating an electronic device according to various embodiments.

FIG. 6 is a flowchart illustrating an example method of operating an electronic device according to various embodiments.

According to various embodiments, the electronic device 101 (e.g., at least one of the processor 120 of FIG. 1, 2A, or 2B, the first communication processor 212 of FIG. 2A, the second communication processor 214 of FIG. 2A, or the integrated communication processor 260 of FIG. 2B) may detect an error in the first RF device in operation 601. In operation 603, the electronic device 101 may identify the first RF path associated with the first RF device and the first frequency (or first frequency band corresponding to the first frequency) corresponding to the first RF path. As described above, the electronic device 101 may identify the first frequency (or first frequency band) corresponding to the first RF path based on association information between each RF path and supported frequency. One or more frequencies (or frequency bands) may correspond to the first RF path.

According to various embodiments, in operation 605, the electronic device 101 may determine whether an alternative RF path other than the first RF path associated with the first frequency (or first frequency band) exists. The electronic device 101 may store association information about each RF path and supported frequency (or frequency band). If there is no alternative RF path other than the first RF path associated with the first frequency (or first frequency band) (No in 605), the electronic device 101 may delete and/or modify the information element associated with the first frequency among the information elements associated with the frequency of the UE capability in operation 607. As an example, it is assumed that the first frequency (or first frequency band) is supported only by the first RF path in the electronic device 101. In this case, the electronic device 101 may identify that there is no alternative path supporting the first frequency (or the first frequency band) other than the first RF path. The electronic device 101 may delete and/or adjust the information element supporting the first frequency (or the first frequency band).

Figure 7:
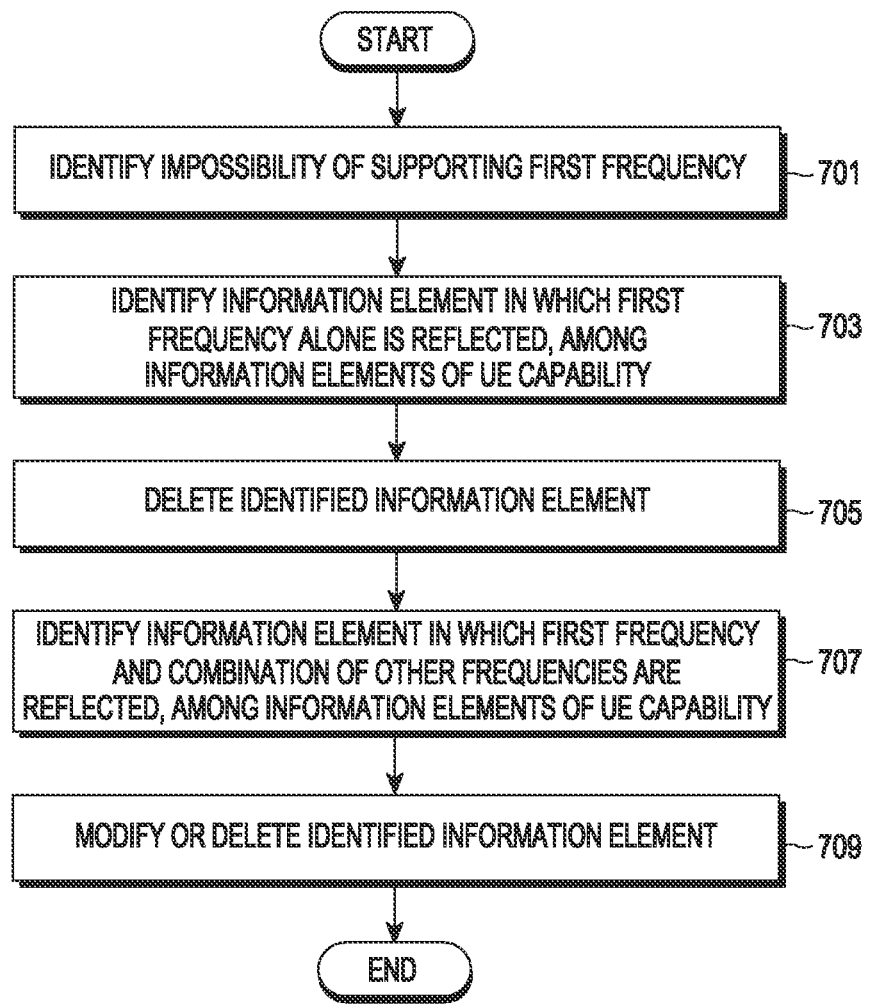
FIG. 7 is a flowchart illustrating an example method of operating an electronic device according to various embodiments.

According to various embodiments, if there is an alternative RF path other than the first RF path associated with the first frequency (or, the first frequency band) (Yes in 605), the electronic device 101 may maintain the information element associated with the first frequency (or first frequency band) among the information elements (e.g., the supported frequency band and/or band combination) associated with the frequency of the UE capability in operation 609. As an example, it is assumed that the first frequency (or first frequency band) is supported by the first RF path and the second RF path in the electronic device 101. In this case, even when an error occurs in the first RF path, the electronic device 101 may identify the second RF path of the first frequency (or the first frequency band) as an alternative path. Accordingly, as the first frequency (or the first frequency band) is supportable, the electronic device 101 may maintain the information element (e.g., the first frequency band in the supported frequency bands and/or the band combination including the first frequency band) associated with the first frequency (or first frequency band). Meanwhile, as described below, the electronic device 101 may adjust the information element for the number of layers of the first frequency (or first frequency band). FIG. 7 is a flowchart illustrating an example method of operating an electronic device according to various embodiments.

According to various embodiments, the electronic device 101 (e.g., at least one of the processor 120 of FIG. 1, 2A, or 2B, the first communication processor 212 of FIG. 2A, the second communication processor 214 of FIG. 2A, or the integrated communication processor 260 of FIG. 2B) may identify that it is impossible to support the first frequency (or first frequency band) in operation 701. For example, the electronic device 101 may identify the first RF device and/or the error in the first RF path associated with the first RF device. The first RF device and/or the first RF path may be associated with the first frequency (or first frequency band). The electronic device 101 may identify that there is no other RF path supporting the first frequency (or the first frequency band) other than the first RF path and may thus identify that support for the first frequency (or the first frequency band) is impossible.

According to various embodiments, in operation 703, the electronic device 101 may identify an information element in which the first frequency (or first frequency band) alone is reflected among the information elements of UE capability. In operation 705, the electronic device 101 may delete the identified information element to which the first frequency (or first frequency band) alone is reflected. For example, the electronic device 101 may delete the radio frequency band included in the supported frequency band list, e.g., "supportedBandListEUTRA" (or "BandList"), among the information elements (IEs) of UE capability. "supportedBandListEUTRA" may indicate E-UTRA radio frequency bands provided by the electronic device 101. For example, the electronic device 101 may adjust the UE capability by deleting the first frequency (e.g., frequency band 5), as shown in Table 2, based on absence of an alternative RF path supporting the first frequency band (e.g., frequency band 5).

TABLE 2

| UE capability before adjustment | UE capability after adjustment |
| --- | --- |
| supportedBandListEUTRA: 4 itemsItem 0 | supportedBandListEUTRA: 4 items |
| SupportedBandEUTRA bandEUTRA: 2 . . . 0 . . . halfDuplex: False | Item 0 SupportedBandEUTRA bandEUTRA: 2 . . . 0 . . . halfDuplex: False |
| Item 1 SupportedBandEUTRA bandEUTRA: 4 . . . 0 . . . halfDuplex: False | Item 1 SupportedBandEUTRA bandEUTRA: 4 . . . 0 . . . halfDuplex: False |
| Item 2 SupportedBandEUTRA bandEUTRA: 5 . . . 0 . . . halfDuplex: False | Item 2 SupportedBandEUTRA bandEUTRA: 17 . . . 0 . . . halfDuplex: False |
| Item 3 SupportedBandEUTRA bandEUTRA: 17 . . . 0 . . . halfDuplex: False | |

Meanwhile, although the UE capability for E-UTRA has been described in Table 2, one of ordinary skill in the art will understand that the electronic device 101 may delete an unsupported frequency band among "supportedBandListNR".

According to various embodiments, in operation 707, the electronic device 101 may identify the information element reflected by the first frequency (or first frequency band) and a combination of other frequencies (e.g., a frequency band combination of CA or a frequency band combination of MR DC) among the information elements of the UE capability. In operation 709, the electronic device 101 may delete or modify the identified information element reflected by the first frequency (or first frequency band) and the combination of other frequencies.

For example, the electronic device may modify or delete information included in a supportable band combination list, e.g., "supportedBandCombinationList" (or, "BandCombinationList"), among the information elements of the UE capability. "supportedBandCombinationList" may refer to a frequency band combination of CA and/or a frequency band combination of MR DC. For example, Table 3 shows IEs regarding a frequency band combination of MC DC, which may refer, e.g., to a combination of frequency band 8 and frequency band 78 of E-UTRA.

TABLE 3

| UE capability before adjustment |
| --- |
| rf-ParametersMRDC {supportedBandCombinationList { { bandList { eutra: { bandEUTRA 8, ca-BandwidthClassDL-EUTRA a, ca-BandwidthClassUL-EUTRA a }, nr: { bandNR 78, ca-BandwidthClassDL-NR a, ca-BandwidthClassUL-NR a } }, featureSetCombination 0, mrdc-Parameters { simultaneousRxTxInterBandENDC supported, asyneIntraBandENDC supported }, supportedBandwidthCombinationSet '0'B }, |

For example, the electronic device 101 may adjust the UE capability by deleting information about the combination of other frequency bands, as shown in Table 3, based on absence of an alternative RF path supporting the first frequency (e.g., frequency band 8). For example, when the first frequency (e.g., frequency band 8) is deleted from the frequency band combination, the corresponding MR DC combination cannot is impossible. Thus, the electronic device 101 may delete the corresponding IE. Meanwhile, in another example, if two or more frequency bands exist except for a specific frequency band, the electronic device 101 may modify the information about the IE of the frequency band combination. For example, in one example, the electronic device 101 may identify that the N4 frequency band is not supported based on a detected error, in the state of storing information elements of a band combination of the B2 frequency band, the B5 frequency band, and the N4 frequency band. In this case, the electronic device 101 may modify the existing UE capability information elements with the frequency band combination of the B2 frequency band and the B5 frequency band so that the NR frequency band is not included.

As described above, the electronic device 101 may adjust the UE capability by modifying or deleting the information element of the UE capability associated with the frequency. The electronic device 101 may modify or delete an infor- According to various embodiments, in operation 807, the electronic device 101 may adjust (e.g., modify) the information element associated with the first frequency (or first frequency band) among the information elements associated with the number of layers of the UE capability. For example, the electronic device 101 may adjust the UE capability as shown in Table 4.

TABLE 4

| UE capability before adjustment | UE capability after adjustment |
| --- | --- |
| rf-Parameters-v1020 {<br>  supportedBandCombination-r10<br>  {<br>    {<br>      {<br>      bandEUTRA-r10 8,<br>      bandParametersDL-r10<br>      {<br>        {<br>        ca-BandwidthClassDL-r10 a,<br>supportedMIMO-CapabilityDL-r10<br>twoLayers<br>        }<br>      }<br>    },<br>    {<br>      bandEUTRA-r10 3,<br>      bandParametersUL-r10<br>      {<br>        {<br>        ca-BandwidthClassUL-r10 a<br>        }<br>      },<br>      bandParametersDL-r10<br>      {<br>        {<br>        ca-BandwidthClassDL-r10 a,<br>supportedMIMO-CapabilityDL-r10<br><u>fourLayers</u><br>        }<br>      }<br>    }<br>  }, | rf-Parameters-v1020<br>{<br>  supportedBandCombination-r10<br>  {<br>    {<br>      {<br>      bandEUTRA-r10 8,<br>      bandParametersDL-r10<br>      {<br>        ca-BandwidthClassDL-r10 a,<br>supportedMIMO-CapabilityDL-r10<br>twoLayers<br>      }<br>    }<br>    },<br>    {<br>      bandEUTRA-r10 3,<br>      bandParametersUL-r10<br>      {<br>        {<br>        ca-BandwidthClassUL-r10 a<br>        }<br>      },<br>      bandParametersDL-r10<br>      {<br>        ca-BandwidthClassDL-r10 a,<br>supportedMIMO-CapabilityDL-r10<br><u>twoLayers</u><br>      }<br>    }<br>  }<br>}, | mation element of UE capability by deleting an unsupported frequency band, which may be performed by an AND operation between UE capability information and the bit mask of the unsupported frequency band. This is described below.

Figure 8:
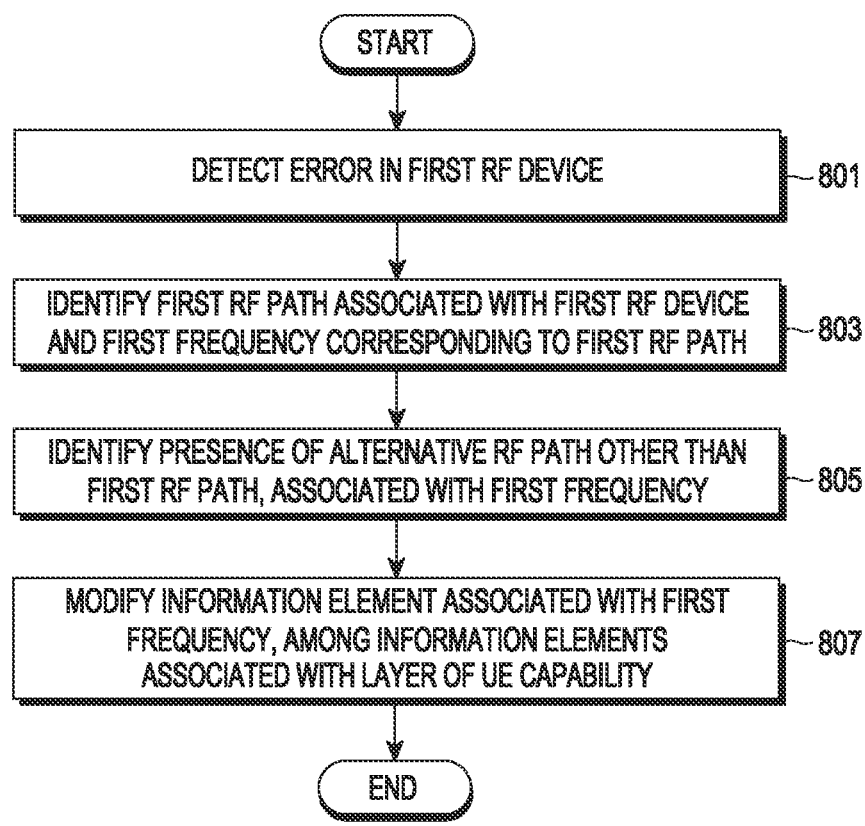
FIG. 8 is a flowchart illustrating an example method of operating an electronic device according to various embodiments.
Figure 9:
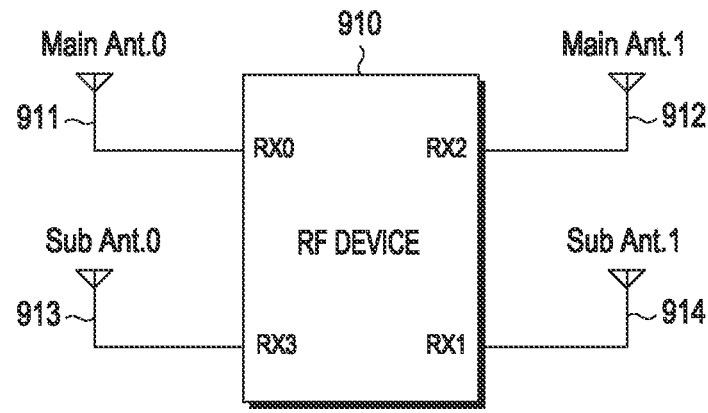
FIG. 9 is a diagram illustrating an example RF path of an electronic device according to various embodiments.

FIG. 8 is a flowchart illustrating an example method of operating an electronic device according to various embodiments. The embodiment of FIG. 8 is described with reference to FIG. 9. FIG. 9 is a diagram illustrating an example RF path of an electronic device according to various embodiments.

According to various embodiments, the electronic device 101 (e.g., at least one of the processor 120 of FIG. 1, 2A, or 2B, the first communication processor 212 of FIG. 2A, the second communication processor 214 of FIG. 2A, or the integrated communication processor 260 of FIG. 2B) may detect an error in the first RF device in operation 801. In operation 803, the electronic device 101 may identify the first RF path associated with the first RF device and the first frequency (or first frequency band corresponding to the first frequency) corresponding to the first RF path. In operation 805, the electronic device 101 may identify that an alternative RF path other than the first RF path associated with the first frequency exists.

For example, in the information element associated with the number of layers of the UE capability before adjustment, the number of layers of frequency band 8 of E-UTRA may be set to 2, and the number of layers of frequency band 3 of E-UTRA may be set to 4. For example, in the electronic device 101, an RF path of MIMO may be provided for frequency band 3 of E-UTRA, and an RF path of SISO may be provided for frequency band 8 of E-UTRA. If an error occurs in some RF paths among the RF paths of MIMO for frequency band 3, the electronic device 101 may perform communication of frequency band 3 using an errorless RF path. In this case, the electronic device 101 may perform SISO communication on frequency band 3. Accordingly, as underlined in Table 4, the electronic device 101 may adjust the UE capability by modifying the number of layers to two for frequency band 3. For example, referring to FIG. 9, the electronic device 101 may include four receive RF paths for supporting the first frequency (e.g., frequency band 3). The RF device 910 may be connected with four antennas 911, 912, 913, and 914 and may process the RF signals output from the antennas 911, 912, 913, and 914 into baseband signals. Four RF paths RX0, RX2, RX3, and RX1 corresponding to the four antennas 911, 912, 913, and 914, respectively, may be defined and perform 4×4 MIMO communication. Accordingly, in the UE capability before adjustment, the number of layers may be set to 4 for the first frequency (e.g., frequency band 3). Meanwhile, the electronic device 101 may detect that an error occurs in any one RF path (e.g., RX1). In this case, the electronic device 101 may maintain the UE capability associated with the first frequency (or first frequency band) based on the presence of another RF path (e.g., RX0, RX2, or RX3) supporting the first frequency (e.g., frequency band 3). Meanwhile, the electronic device 101 may modify the UE capability associated with the number of layers of the first frequency (or first frequency band) from 4 to 2. Thereafter, upon performing communication associated with the first frequency (or first frequency band), the electronic device 101 may perform communication using two of the remaining RF paths (e.g., RX0, RX2, and RX3). The electronic device 101 may select, e.g., two RF paths with high performance among the remaining RF paths, but the selection scheme is not limited thereto.

An AND operation of the bit mask for an unsupported band or a band whose number of layers has been adjusted is described below. For example, Table 5 shows examples of a UE capability before adjustment and the UE capability after adjusting a result of an AND operation with a bit mask.

TABLE 5

| UE capability before adjustment | bit mask | UE capability after adjustment |
| --- | --- | --- |
| B2A[4] + B5A[2] + N4A[4] | B2A[2] | B2A[2] + B5A[2] + N4A[4] |
| B2A[4] + B12A[2] + N4A[4] | | B2A[2] + B12A[2] + N4A[4] |
| B2A[4] + B5A[2] + N66A[4] | | B2A[2] + B5A[2] + N66A[4] |
| B66A[4] + B5A[2] + N4A[4] | | B66A[4] + B5A[2] + N4A[4] |
| B2A[4] + B5A[2] + N4A[4] | N4A[4] | B2A[4] + B5A[2] |
| B2A[4] + B12A[2] + N4A[4] | | B2A[4] + B12A[2] |
| B2A[4] + B5A[2] + N66A[4] | | B2A[2] + B5A[2] + N66A[4] |
| B66A[4] + B5A[2] + N4A[4] | | B66A[4] + B5A[2] |

The information elements in Table 5 may be written in the format of a frequency band (e.g., B2, B5, N4, etc.), a downlink bandwidth class (e.g., A), and the number of reception layers (e.g., [4], [2]). For example, "B2A[4]+B5A[2]+N4A[4]" may refer to the electronic device 101 supporting a band combination of the B2 frequency band in which the number of layers is 4, and the downlink bandwidth class is A, the B5 frequency band in which the number of layers is 2, and the downlink bandwidth class is A, and the N4 frequency band in which the number of layers is 4, and the downlink bandwidth class A. For example, as in the first example of Table 5, the electronic device 101 may identify that some RF paths of the B2 frequency band are unavailable, and thus, the number of layers needs to be reset to 2, based on a detected error. For example, when the identification information about the receive RF path corresponding to B2A[4] is "21", "22", "23", and "24", an error may be detected from the RF path having the identification information "23". Accordingly, the electronic device 101 may identify that the number of layers of the B2 frequency band should be adjusted from 4 to 2. Accordingly, the electronic device 101 may correct B2A[4] of the UE capability before adjustment to B2A[2] of the bit mask. The electronic device 101 may modify and/or delete information elements of the UE capability according to the UE capability after adjustment. Or, as in the second example of Table 5, the electronic device 101 may identify that all of the RF paths of the N4 frequency band are unavailable, and thus, information associated with the N4 frequency band needs to be deleted. For example, when the identification information about the receive RF path corresponding to N4A[4] is "41", "42", "23", and "44", an error may be detected from the entire receive RF path. Thus, the electronic device 101 may delete N4A[4] of the UE capability before adjustment. The electronic device 101 may modify and/or delete information elements of the UE capability according to the UE capability after adjustment.

Figure 10:
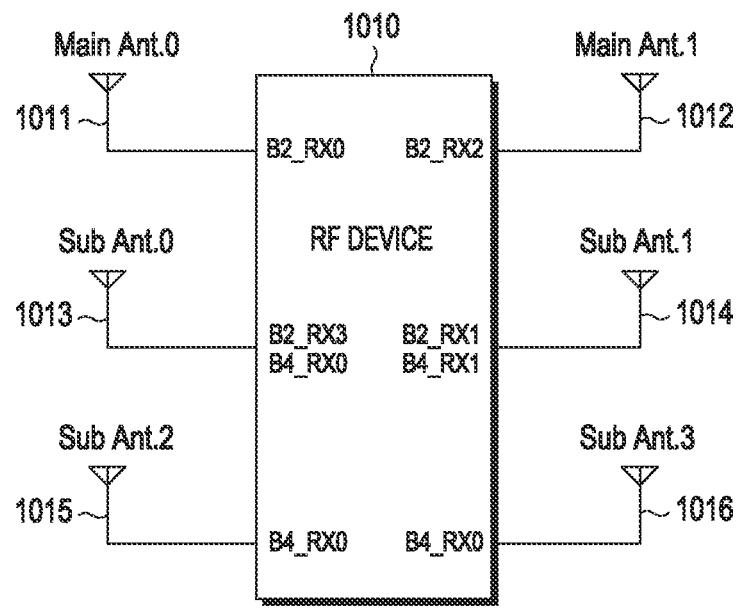
FIG. 10 is a diagram illustrating an RF path of an electronic device according to various embodiments.

FIG. 10 is a diagram illustrating an RF path of an electronic device according to various embodiments.

According to various embodiments, the electronic device 101 may include four receive RF paths (e.g., B2_RX0, B2_RX1, B2_RX2, and B2_RX3) for supporting the first frequency (e.g., frequency band 2). The RF device 1010 may be connected to the four antennas 1011, 1012, 1013, and 1014 and process RF signals of the first frequency (e.g., frequency band 2) output from the antennas 1011, 1012, 1013, and 1014 into baseband signals. The electronic device 101 may include four receive RF paths (e.g., B4_RX0, B4_RX1, B2_RX2, and B2_RX3) for supporting the second frequency (e.g., frequency band 4). The RF device 1010 may be connected to four antennas 1013, 1014, 1015, and 1016 and process RF signals of the second frequency (e.g., frequency band 4) output from the antennas 1013, 1014, 1015, and 1016 into baseband signals. For example, in the embodiment of FIG. 10, it is assumed that an error occurs in the antennas 1013 and 1014 (or the corresponding component). Accordingly, the electronic device 101 may adjust the number of layers corresponding to the first frequency (e.g., frequency band 2) to 2 and may adjust the number of layers corresponding to the second frequency (e.g., frequency band 4) to 2.

As another example, the electronic device 101 may support MIMO 1011, 1012, 1013, and 1014 for the B2 frequency band and support SISO 1013 and 1014, thus supporting a CA frequency band combination of B2A[4] 1011, 1012, 1013, and 1014) and B4A[2] 1015 and 1016. Meanwhile, if an error occurs in the RF path 1013 and 1014, the electronic device 101 may adjust the UE capability with the frequency band combination of B2A[2] 1011 and 1012 and B4A[2] 1015 and 1016.

Figure 11:
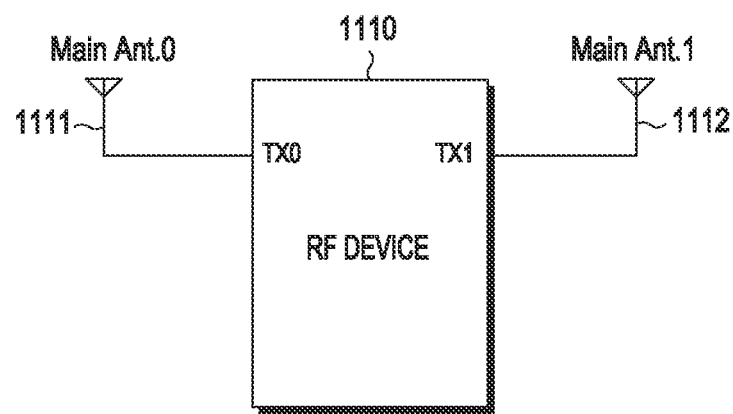
FIG. 11 is a diagram illustrating an example RF path of an electronic device according to various embodiments.

FIG. 11 is a diagram illustrating an example RF path of an electronic device according to various embodiments.

According to various embodiments, the electronic device 101 may be implemented to support two transmit RF paths TX0 and TX1. The RF device 1110 may be connected to two antennas 1111 and 1112 and may convert the baseband signal from a communication processor (e.g., the first communication processor 212, the second communication processor 214, or the integrated communication processor 260) into an RF signal, and provide it to the antennas 1111 and 1112. For example, in the embodiment of FIG. 11, it is assumed that an error occurs in the antenna 1111 (or the corresponding component). Accordingly, the electronic device 101 may adjust the number of supported transmit RF paths from 2 to 1. For example, the rank associated with MIMO of uplink in the information element of UE capability before adjustment may be changed from 2 to 1. For example, if the information element of UE capability before adjustment is 2t4r indicating that 2 transmit RF paths and 4 receive RF paths are supported, the information element of the UE capability after adjustment may be adjusted to t1r4. Thereafter, the electronic device 101 may control to provide an RF signal for transmission only through an errorless RF path.

Figure 12:
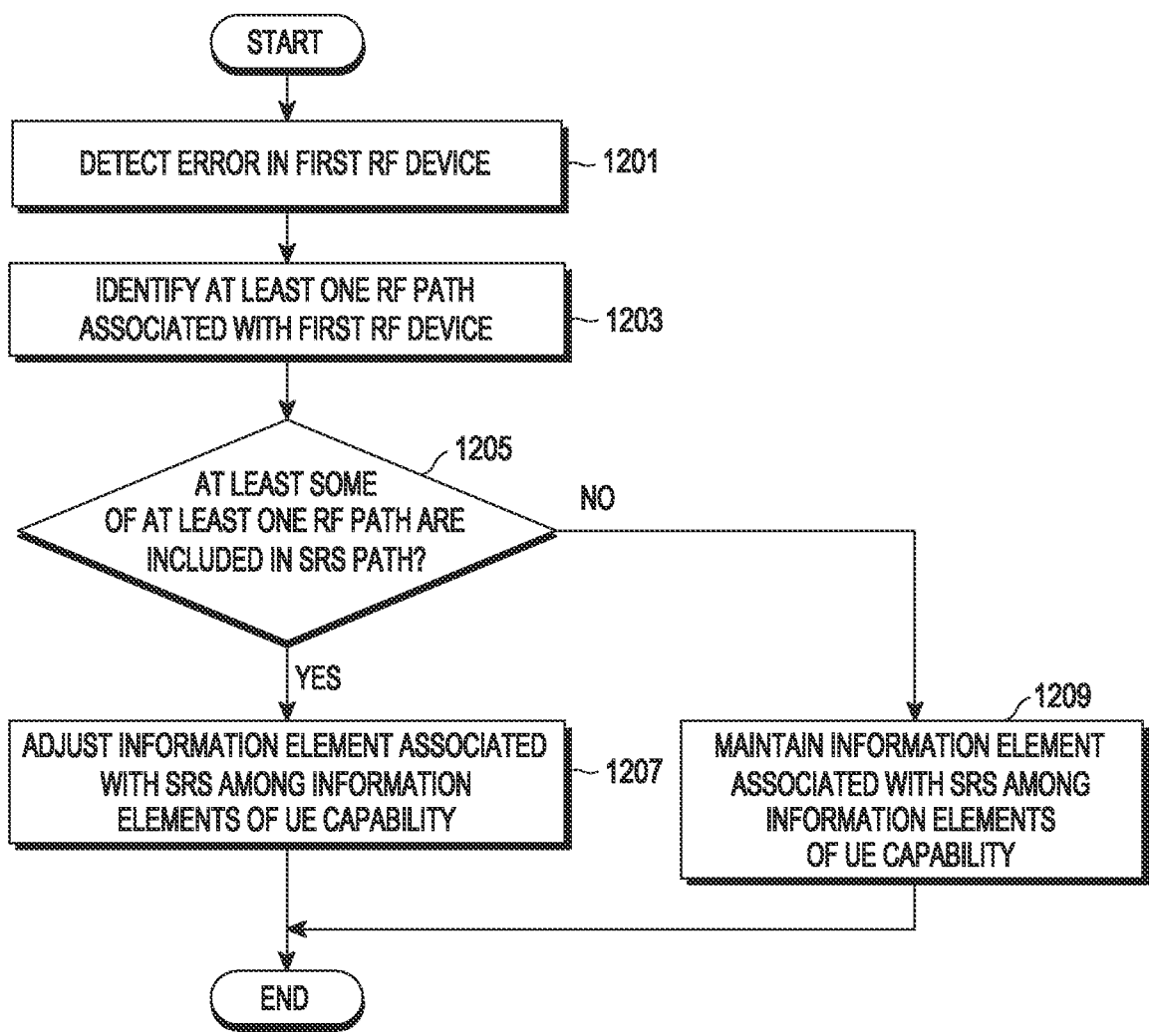
FIG. 12 is a flowchart illustrating an example method of operating an electronic device according to various embodiments.
Figure 13:
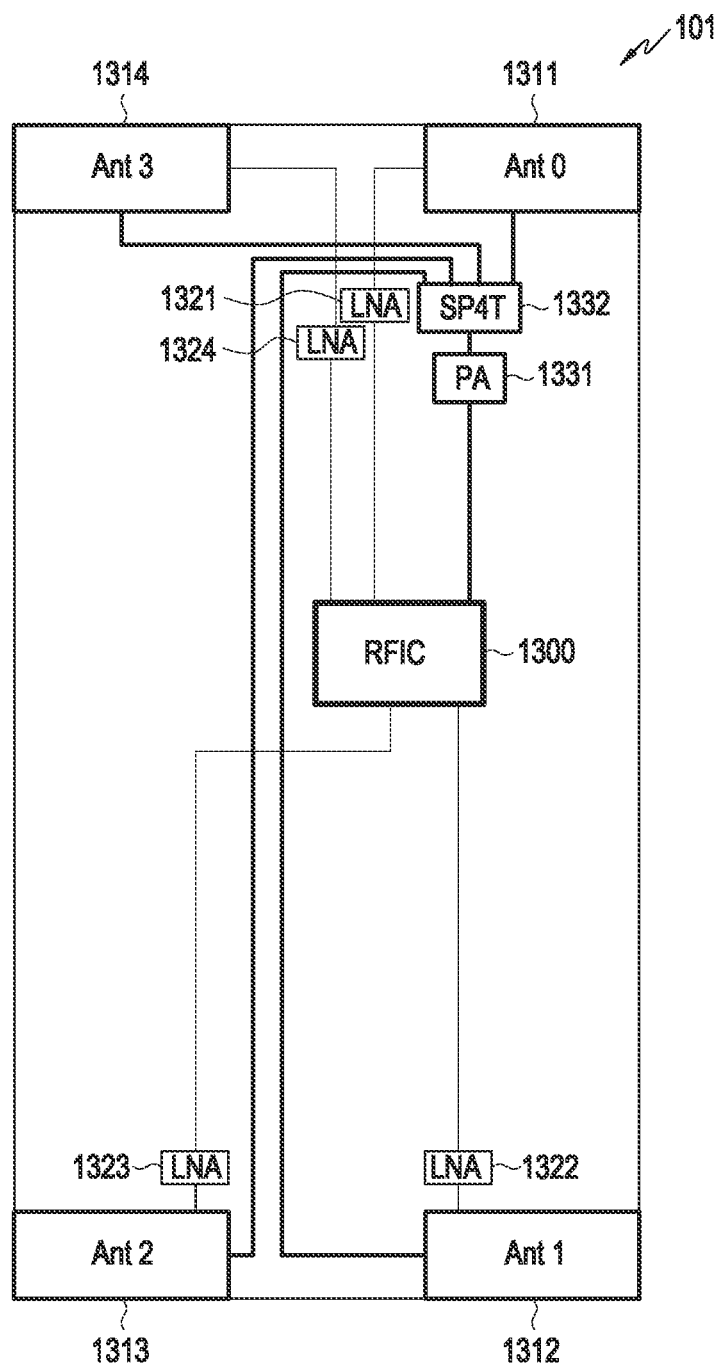
FIG. 13 is a diagram illustrating example transmission of an SRS by an electronic device according to various embodiments.

FIG. 12 is a flowchart illustrating an example method of operating an electronic device according to various embodiments. The embodiment of FIG. 12 is described with reference to FIG. 13. FIG. 13 is a diagram illustrating example transmission of a sounding reference signal (SRS) by an electronic device according to various embodiments.

According to various embodiments, the electronic device 101 (e.g., at least one of the processor 120 of FIG. 1, 2A, or 2B, the first communication processor 212 of FIG. 2A, the second communication processor 214 of FIG. 2A, or the integrated communication processor 260 of FIG. 2B) may detect an error in the first RF device in operation 1201. In operation 1203, the electronic device 101 may identify at least one RF path associated with the first RF device.

According to various embodiments, in operation 1205, the electronic device 101 may determine whether at least some of at least one RF path are included in the SRS path. When at least some of at least one RF path are included in the SRS path (Yes in 1205), the electronic device 101 may adjust the information element associated with the SRS among the information elements of the UE capability in operation 1207. When at least some of the at least one RF path are not included in the SRS path (No in 1205), the electronic device 101 may maintain the information element associated with the SRS among the information elements of the UE capability in operation 1209.

For example, referring to FIG. 13, the electronic device 101 may include a plurality of antennas 1311, 1312, 1313, and 1314. The RFIC 1300 of the electronic device 101 may provide an RF signal to the PA 1331, and the PA 1331 may amplify the received RF signal and provide it to any one of the antennas 1311, 1312, 1313, and 1314. For example, the electronic device 101 may determine an antenna to receive the RF signal by controlling the SP4T switch 1332. Meanwhile, LNAs 1321, 1322, 1323, and 1324 may be connected with the antennas 1311, 1312, 1313, and 1314, respectively. The LNAs 1321, 1322, 1323, and 1324 may amplify the RF signals output from the antennas 1311, 1312, 1313 and 1314 and provide the amplified RF signals to the RFIC 1300. For example, the electronic device 101 may control the SP4T switch 1332 to sequentially provide RF signals corresponding to the SRS to each of the antennas 1311, 1312, 1313, and 1314. Accordingly, the electronic device 101 may transmit the SRS through each of the four antennas 1311, 1312, 1313 and 1314. The system shown in FIG. 13 may be named t1r4. Table 6 is an example of information elements of UE capability associated with various SRSs.

two antennas (or corresponding components) among the antennas 1311, 1312, 1313 and 1314, the electronic device 101 may use the UE capability information element corresponding to t1r2 in Table 6. In this case, the electronic device 101 may transmit the SRS through two antennas. The electronic device 101 may select two antennas to transmit the SRS based on preset priority. The electronic device 101 may select an antenna to transmit the SRS based on a current state (e.g., a grip position) of the electronic device 101. The electronic device 101 may select an antenna to transmit the SRS based on the SRS transmission power corresponding to each of errorless antennas. The SRS transmission power may be limited, e.g., by at least one of path loss in RF path, SAR limitations, or UE maximum output power. The electronic device 101 may select an antenna by identifying the magnitude of the SRS transmission power corresponding to each of the remaining antennas. If an error occurs in three or more antennas (or corresponding components) among the antennas 1311, 1312, 1313 and 1314, the electronic device 101 may use the UE capability information element corresponding to not supported in Table 6.

Figure 14:
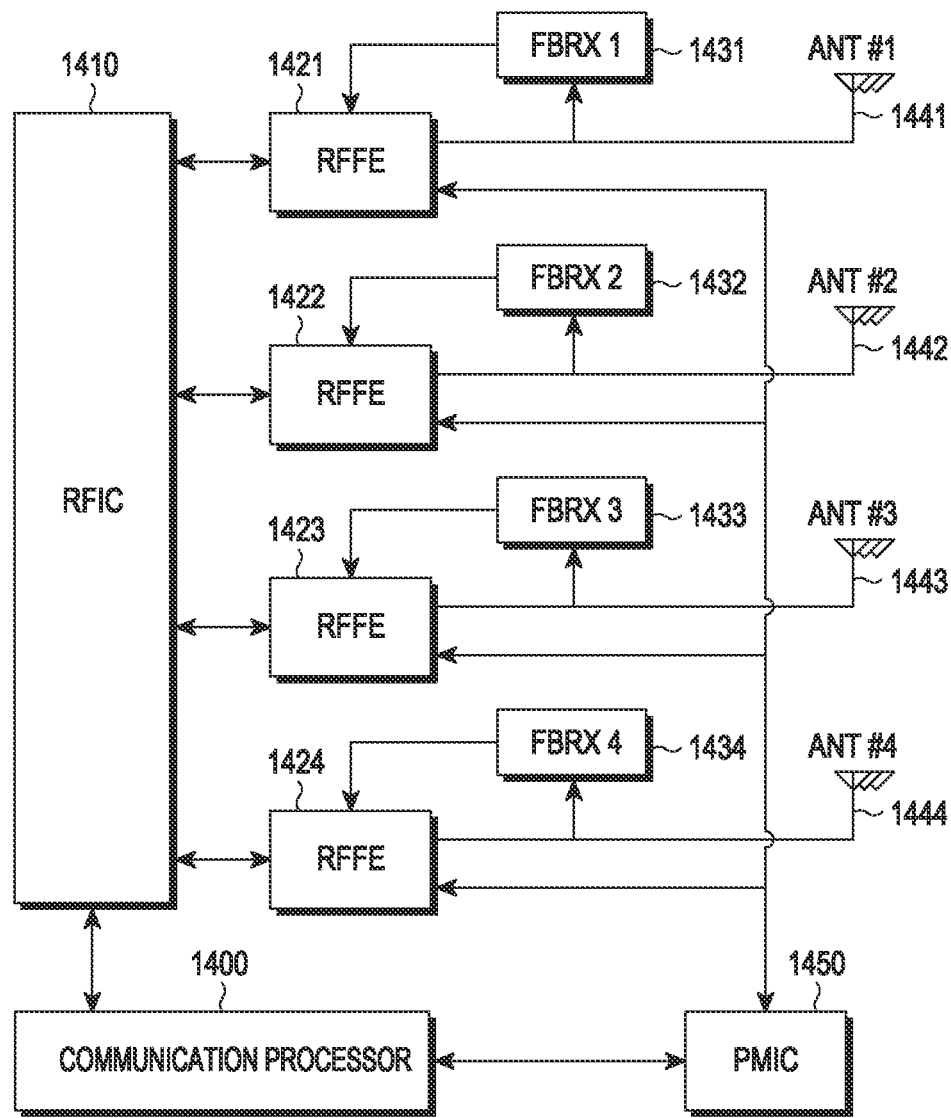
FIG. 14 is a block diagram illustrating an example configuration of an electronic device according to various embodiments.

FIG. 14 is a block diagram illustrating an example configuration of an electronic device according to various embodiments.

According to various embodiments, the electronic device 101 may include at least one of a communication processor (e.g., including processing circuitry) 1400, an RFIC 1410, RFFEs 1421, 1422, 1423, and 1424, feedback receivers (FBRXs) 1431, 1432, 1433, and 1434, antenna modules 1441, 1442, 1443, and 1444, or a PMIC 1450. The communication processor 1400 may include at least one of, e.g., the processor 120, the first communication processor 212, the second communication processor 214, or the integrated communication processor 260. The communication processor 1400 of FIG. 14 may support, e.g., the FR2 frequency of 5G communication. The RFIC 1410 may include, e.g., a third RFIC 226 and/or a fourth RFIC 228. The RFFEs 1421, 1422, 1423, and 1424 may include, e.g., a third RFFE 236. The RFFEs 1421, 1422, 1423, and 1424 may include, e.g., a phase shifter for shifting the phase of the RF signal applied

TABLE 6

| t1r4 | t1r2 | Not supported |
|---|---|---|
| UECapabilityInformation-<br>bandInformationEUTRA:<br>bandEUTRA<br>3bandInformationNR:<br>bandNR 41<br>supportedBandCombination-<br>List-v15040 srs-TxSwitch-<br>v1540 supportedSRS-<br>TxPortSwitch<br>notsupportedsrs-<br>TxSwitch-v1540<br>supportedSRS-<br>TxPortSwitch t1r4 | UECapabilityInformation-<br>bandInformationEUTRA:<br>bandEUTRA<br>3bandInformationNR:<br>bandNR 41<br>bandlist-v1540 srs-TxSwitch<br>supportedSRS-TxPortSwitch<br>notSupportedsrs-TxSwitch<br>supportedSRS-TxPortSwitch<br>t1r2 | UECapabilityInformation-<br>bandInformationEUTRA:<br>bandEUTRA<br>3bandInformationNR:<br>bandNR 41<br>bandList-v1540<br>srs-TxSwitch<br>supportedSRS-<br>TxPortSwitch<br>notSupported<br>srs-TxSwitch<br>supportedSRS-<br>TxPortSwitch<br>notSupported |

As shown in Table 6, e.g., in the information elements of UE capability, for NR frequency band 41, for the supported SRS transmission port switch information element (supportedSRS-TxPortSwitch), the information t1r4, t1r2, and not supported may be reflected. In the example shown in FIG. 13, when no error occurs in the RF path, the electronic device 101 may use the UE capability information element corresponding to t1r4 of Table 6. If an error occurs in one or to each of the antennas of the antenna modules 1441, 1442, 1443, and 1444. The PMIC 1450 may provide power to, e.g., the RFFEs 1421, 1422, 1423, and 1424.

For example, each of the antenna modules 1441, 1442, 1443, and 1444 may form or receive a beam. Table 7 is an example of the association information between the beam numbers for each antenna module.

TABLE 7

| Beam number | Identification number of antenna module |
|---|---|
| 1 | 1 |
| 2 | 1 |
| 3 | 2 |
| 4 | 2 |
| 5 | 3 |

For example, if it is determined that an error occurs in the antenna module of identification number 2 and/or the RFFE associated with the antenna module of identification number 2, the electronic device 101 may delete beam numbers 3 and 4 corresponding to the antenna module of identification number 2 from the beam table. Accordingly, the electronic device 101 may not perform scanning on beam numbers 3 and 4.

Figure 15:
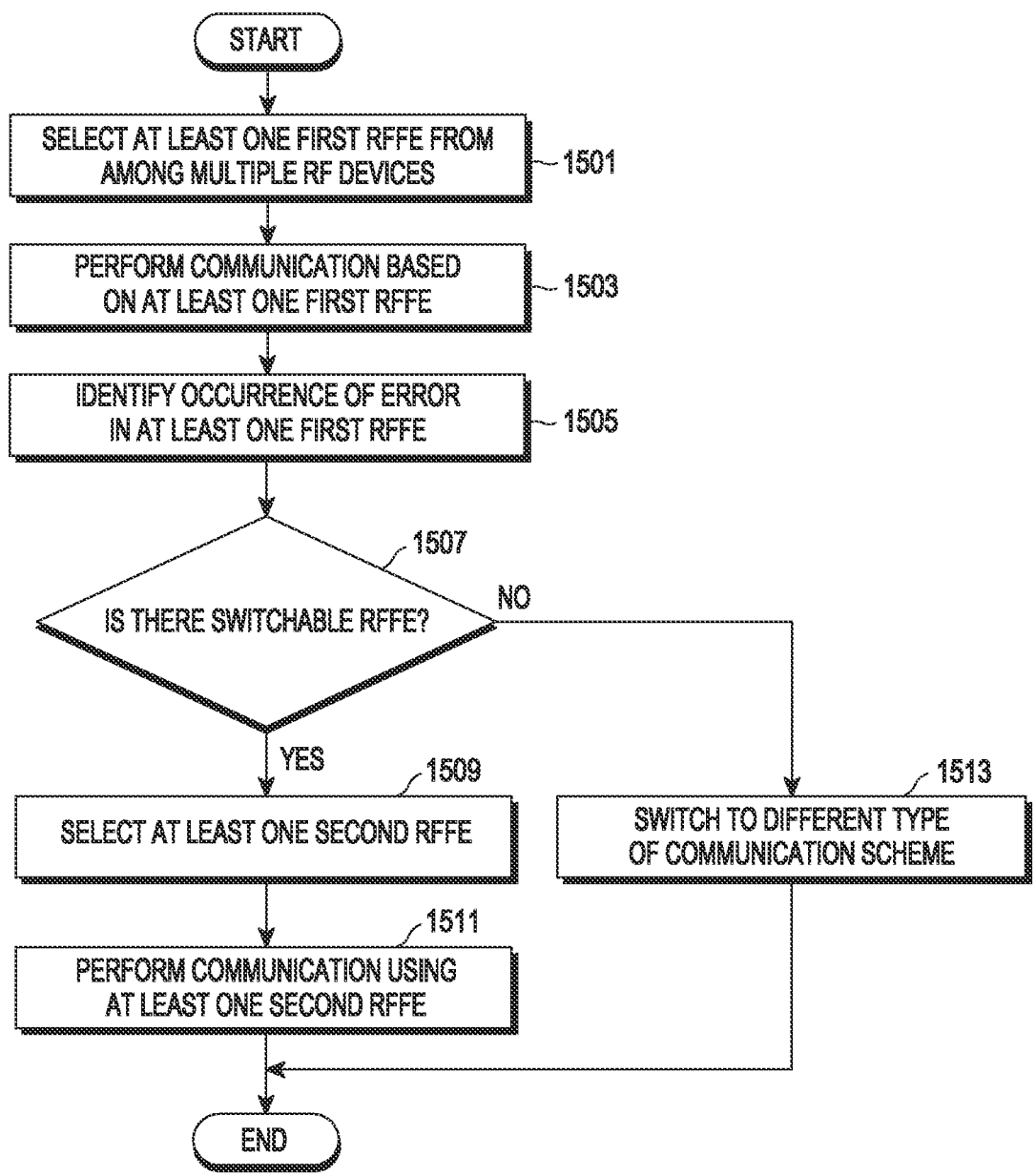
FIG. 15 is a flowchart illustrating an example method of operating an electronic device according to various embodiments.

FIG. 15 is a flowchart illustrating an example method of operating an electronic device according to various embodiments.

According to various embodiments, the electronic device 101 (e.g., at least one of the processor 120 of FIG. 1, 2A, or 2B, the first communication processor 212 of FIG. 2A, the second communication processor 214 of FIG. 2A, or the integrated communication processor 260 of FIG. 2B) may select at least one first RFFE from among a plurality of RF devices in operation 1501. For example, in the embodiment of FIG. 15, it is assumed that the electronic device 101 selects a frequency included in FR2 to perform mmWave communication. For example, the electronic device 101 may control the degree of phase shift of each of the phase shifters included in the at least one first RFFE based on the index of the selected transmission beam. The electronic device 101 may identify the target power of at least one antenna port of the antenna array corresponding to at least one first RFFE and control the RFIC and/or at least one first RFFE to allow the RF signal of the target power to be input to at least one antenna port. In operation 1503, the electronic device 101 may perform communication based on at least one first RFFE.

According to various embodiments, the electronic device 101 may identify that an error occurs in at least one first RFFE in operation 1505. The electronic device 101 may identify whether a switchable RFFE exists in operation 1507. For example, the electronic device 101 may be implemented to include a plurality of RFFEs and may determine whether there is an RFFE for performing mmWave communication other than the first RFFE. If a switchable (or alternative) RFFE exists (Yes in 1507), the electronic device 101 may select at least one second RFFE in operation 1509. In operation 1511, the electronic device 101 may perform communication through at least one second RFFE. If there is no switchable RFFE (No in 1507), the electronic device 101 may switch to another type of communication scheme in operation 1513. For example, the electronic device 101 may select a frequency included in FR1 and perform communication according to RAT (e.g., NR) and CN (e.g., 5GC) of FR1. The electronic device 101 may select an RF path corresponding to a frequency included in FR1 and it may perform communication based on the selected RF path. For example, the electronic device 101 may perform a system fallback (e.g., EPS fallback) (or RAT fallback (e.g., E-UTRA fallback), or CN fallback (e.g., EPC fallback)). After the fallback, the electronic device 101 may select an RF path corresponding to the fallback system (or RAT or CN) and may perform communication based on the selected RF path.

Figure 16A:
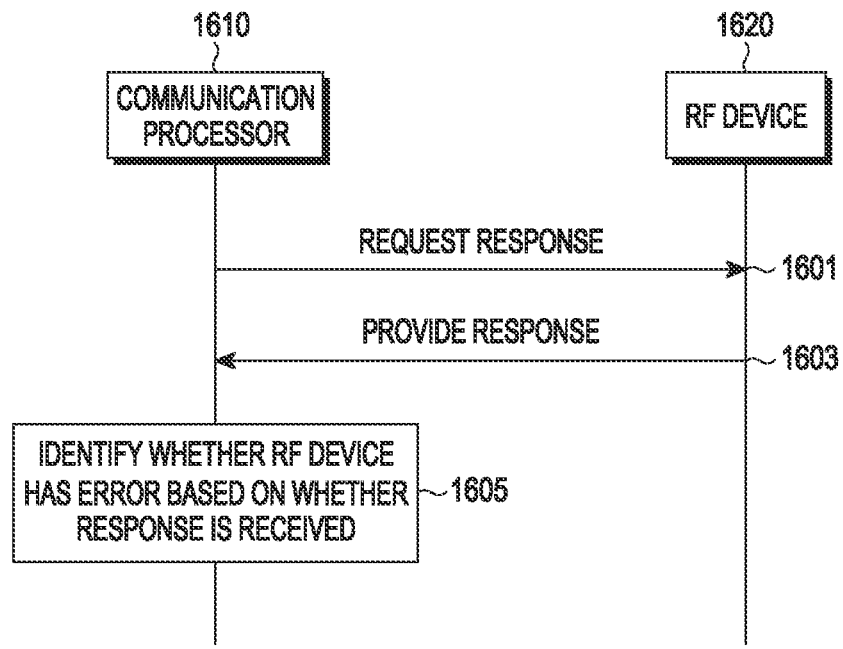
FIG. 16A is a signal flow diagram illustrating an example method of operating an electronic device according to various embodiments.
Figure 16B:
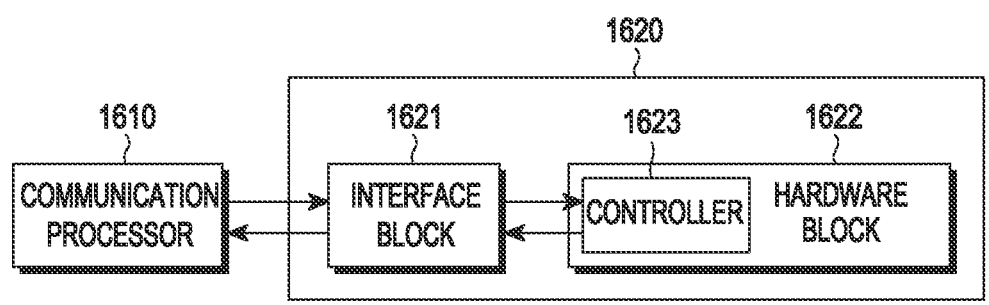
FIG. 16B is a diagram illustrating an example scan between a communication processor and an RF device according to various embodiments.

FIG. 16A is a signal flow diagram illustrating an example method of operating an electronic device according to various embodiments. The embodiment of FIG. 16A is described with reference to FIG. 16B. FIG. 16B is a block diagram illustrating an example scan between a communication processor and an RF device according to various embodiments.

According to various embodiments, the electronic device 101, e.g., the communication processor 1610 of FIG. 16B, may send a request for a response to an RF device 1620. The communication processor 1610 of FIG. 16B may be at least one of, e.g., the processor 120, the first communication processor 212, the second communication processor 214, or the integrated communication processor 260. For example, the communication processor 1610 may send a request for a response to the RF device 1620 through a mobile industry processor interface (MIPI) bus. The RF device 1620, which is hardware for transmitting and/or receiving, e.g., RF signals, may be an RFIC and/or an RFFE, but is not limited thereto as long as it is at least one piece of communication circuit hardware positioned on the RF path to process RF signals. The RF device may be referred to as a communication circuit in the disclosure. For example, the RF device 1620 may include an interface block (e.g., including interface circuitry) 1621 and a hardware block (e.g., including various circuitry) 1622 as shown in FIG. 16B, and the hardware block 1622 may include a controller (e.g., including control or processing circuitry) 1623. The interface block 1621 may perform data transmission/reception between the communication processor 1610 and the RF device 1620, and it may be implemented as a block for MIPI, e.g., but there is no limitation on the type of interface and the type of the interface block 1621. For example, a serial interface or a manufacturer customized interface may be used, and is not limited to a specific type. The hardware block 1622 may include at least one piece of hardware configured to perform processing for transmission and/or reception of RF signals. The controller 1623 may control at least one piece of hardware configured to process RF signals included in the hardware block 1622. For example, the controller 1623 may control at least one piece of hardware configured to process RF signals based on a command received from the communication processor 1610 through the interface block 1621. The response request may be made, e.g., after the electronic device 101 is booted up, but the time or trigger of the request is not limited to a specific one.

Referring to FIG. 16A, in operation 1603, the RF device 1620 may provide a response to the communication processor 1610 in response to the request in operation 1601. For example, when a MIPI is used between the communication processor 1610 and the RF device 1620, the communication processor 1610 may send a request for a unique slave identifier (USID) of the RF device 1620 to the RF device 1620. The RF device 1620 may provide a USID (e.g., manufacturer id (mid) and/or product id (pid)) to the communication processor 1610 in response to the request.

According to various embodiments, the communication processor 1610 may, in operation 1605, identify whether the RF device 1620 has an error based on whether a response is received. For example, when the requested response is not received from the RF device 1620, the communication processor 1610 may identify that an error occurs in the corresponding RF device 1620. The communication processor 1610 may manage the occurrence of an error the corresponding RF device 1620. For example, when an error occurs in the interface block 1621 and/or the hardware block 1622, the RF device 1620 may fail to provide a response. Thereafter, when the communication processor 1610 selects the RF path associated with the corresponding RF device 1620, as an RF path for communication, the electronic device 101 may stop using the corresponding RF path and may perform at least one operation to use another RF path.

According to various embodiments, the electronic device 101 may detect an error of the RF device 1620 according to a scheme for reading a register of the RF device 1620. For example, the electronic device 101 may write a specific value to the specific address corresponding to the RF device 1620 and then read the value from the corresponding address. When the read value and the written value are different from each other, the electronic device 101 may determine that an error has occurred in the RF device 1620. When the read value and the written value are the same, the electronic device 101 may determine that no error has not occurred in the RF device 1620. According to various embodiments, the electronic device 101 may change the GPIO state of the RF device 1620 (e.g., from high to low, or from low to high). The electronic device 101 may determine whether an error occurs based on whether the state of the GPIO whose state has been changed has been intentionally changed by manipulation. According to various embodiments, the electronic device 101 may determine that an error has occurred in the RF device 1620 when the temperature measured around the RF device 1620 is included in a designated range.

Figure 17:
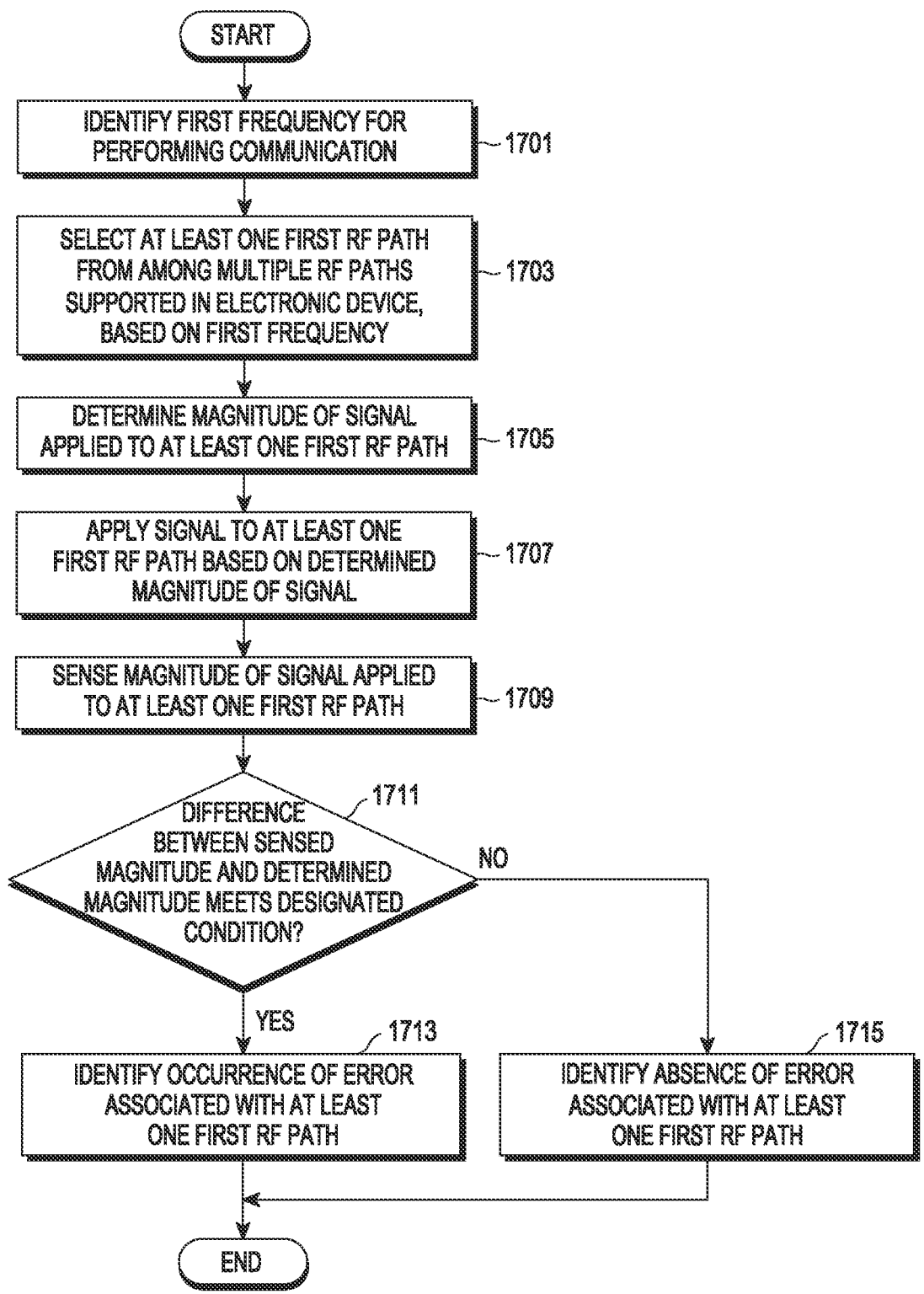
FIG. 17 is a flowchart illustrating an example method of operating an electronic device according to various embodiments.

FIG. 17 is a flowchart illustrating an example method of operating an electronic device according to various embodiments.

According to various embodiments, the electronic device 101 (e.g., at least one of the processor 120 of FIG. 1, 2A, or 2B, the first communication processor 212 of FIG. 2A, the second communication processor 214 of FIG. 2A, or the integrated communication processor 260 of FIG. 2B) may identify a first frequency (or a first frequency band corresponding to the first frequency) for performing communication in operation 1701. In operation 1703, the electronic device 101 may select at least one first RF path from among a plurality of RF paths supported by the electronic device 101 based on the first frequency (or first frequency band).

According to various embodiments, the electronic device 101 may determine the magnitude of the signal applied to the at least one first RF path, in operation 1705. For example, the electronic device 101 may determine the magnitude of the transmission target signal. In one example, when the electronic device 101 transmits a signal based on the PUSCH, the transmission power of the PUSCH may be determined based on Equation 1.

$$P_{PUSCH}(i) = \min\{P_{CMAX}, 10\log_{10}(M_{PUSCH}(i)) + P_{O\_PUSCH}(j) + \alpha(j) \cdot PL + \Delta_{TF}(i) + f(i)\}[\text{dBm}]$$ [Equation 1]

PCMAX is the maximum output power of the electronic device 101. MPUSCH(i) is the number of resource blocks allocated to the electronic device 101. PO_PUSCH(j) is the sum of PO_NOMINAL_PUSCH(j) (a parameter specified by the cell) and PO_UE_PUSCH(j) (a parameter specified by the electronic device 101). PL is the downlink path-loss measured by the electronic device 101. The scaling factor α(j) may be determined in a higher layer considering the path loss mismatch between the uplink channel and the downlink channel. ΔTF(i) is the modulation and coding scheme (MCS) compensation parameter or the transport format (TF) compensation parameter. f(i) is the value adjusted by downlink control information (DCI) from the base station after initial setting. At least some of the parameters for Equation 1 may follow, e.g., 3GPP TS 36.213. For example, as in Equation 1, the electronic device 101 may set the smaller of the calculated transmission power and the maximum output power of the PUSCH, as the transmission power. The maximum output power set for the electronic device 101 may be defined based on, e.g., the class of the electronic device 101. Meanwhile, the output power may be additionally backed off, e.g., by a SAR event, or dynamic power sharing (DPS) with another RAT. The above-described example has been described for the transmission power for the PUSCH. The transmission power may be set not only for the PUSCH but also for various channels (e.g., PUCCH or PRACH) (or signal, e.g., SRS), and the setting method may follow, e.g., 3GPP TS 36.213 or 3GPP TS 38.213.

According to various embodiments, the electronic device 101 may, in operation 1707, apply a signal to at least one first RF path based on the determined magnitude of the signal. The electronic device 101 may control at least one RF device associated with the at least one first RF path so that an RF signal having the determined magnitude is input to the antenna port. For example, the electronic device 101 may control the amplifier associated with the first RF path, but there is no limitation on the type and/or number of RF devices to be controlled.

According to various embodiments, the electronic device 101 may sense the magnitude of the signal applied to the at least one first RF path, in operation 1709. For example, the electronic device 101 may sense the magnitude of the RF signal applied to the antenna port, but there is no limitation as long as the position is the same as the position where the target power is set, and the position where the target power is set is not limited either.

According to various embodiments, in operation 1711, the electronic device 101 may identify whether a difference between the sensed magnitude and the determined magnitude meets a designated condition. The electronic device 101 may also identify whether a ratio, instead of or in addition to the difference, meets a designated condition. The designated condition may be set as a condition corresponding to a case in which an error associated with the RF path occurs. The designated condition may be, e.g., that the difference between the sensed magnitude and the determined magnitude is larger than or equal to a threshold, but is not limited thereto. The designated condition may be the same for each channel (or signal), but may be set to differ. For example, a threshold used for PUCCH or PUSCH transmission may be the same as a threshold used for SRS transmission, but may be different depending on the case. The designated condition may be set to differ for each target power. For example, the threshold when the target power is a first magnitude (e.g., 23 dBm) and the threshold when the target power is a second magnitude (e.g., 20 dBm) may be the same, but may be different in some cases. When it is identified that the designated condition is met (Yes in 1711), the electronic device 101 may identify that an error associated with at least one first RF path occurs in operation 1713. For example, when the difference between the target power and the sensed power is equal to or larger than a threshold, the electronic device 101 may identify that an error associated with the first RF path has occurred. If it is identified that the designated condition is not met (No in 1711), the electronic device 101 may identify that an error associated with the at least one first RF path does not occur in operation 1715. As is described below, if it is identified that an error has occurred, the electronic device 101 may stop using the first RF path and may perform at least one operation for use of another RF path. Alternatively, the electronic device 101 may identify whether an error has occurred based on other parameters (e.g., VSWR) in addition to the magnitude of power, and the type of parameters is not limited to a specific one.

Figure 18:
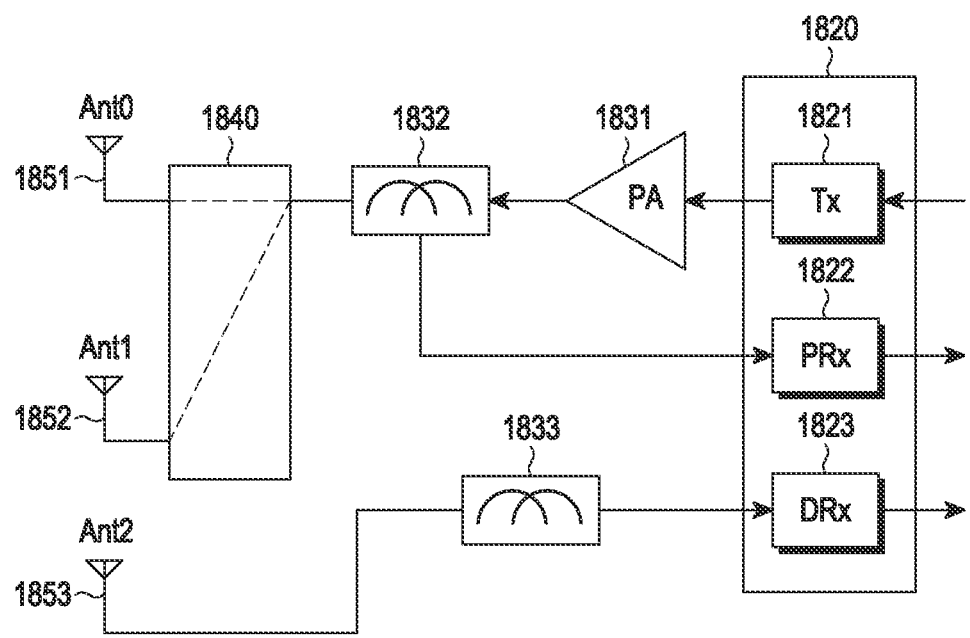
FIG. 18 is a diagram illustrating an operation of an electronic device according to various embodiments.

FIG. 18 is a diagram illustrating an example method of operating an electronic device according to various embodiments.

According to various embodiments, the electronic device 101 may include a processing circuit 1820 including a transmission signal processing component (e.g., including various circuitry) 1821 and reception signal processing components (e.g., including various circuitry) 1822 and 1823. For example, the transmission signal processing component 1821 may provide an RF signal to the power amplifier 1831. The power amplifier 1831 may amplify and output the received RF signal. The amplified RF signal may be provided to the switch 1840 through a filter 1832. The electronic device 101 may control the switch 1840 so that the RF signal is provided to either the first antenna 1851 or the second antenna 1852. The reception signal processing components 1822 and 1823 may process and output the received RF signal from the antennas 1852 and 1853 through the filters 1832 and 1833. Although not shown, the antennas 1851, 1852, and 1853 may include a radiator for radiation and at least one tuner (e.g., an aperture tuner and/or an impedance tuner).

According to various embodiments, the electronic device 101 may control the switch 1840, considering antenna switch diversity, so that the RF signal is applied to an antenna having a relatively better performance among the antennas 1851 and 1852. For example, the electronic device 101 may select an antenna identified as having a smaller path loss, but there is no limitation. Meanwhile, the electronic device 101 may identify that an error occurs in any one antenna (or a corresponding component). In this case, the electronic device 101 may control the switch 1840 to apply the RF signal only to an antenna other than the corresponding antenna, without applying the RF signal to the corresponding antenna. In other words, since the antenna switch diversity operation cannot be performed, RF signal application according to path loss cannot be applied.

Figure 19:
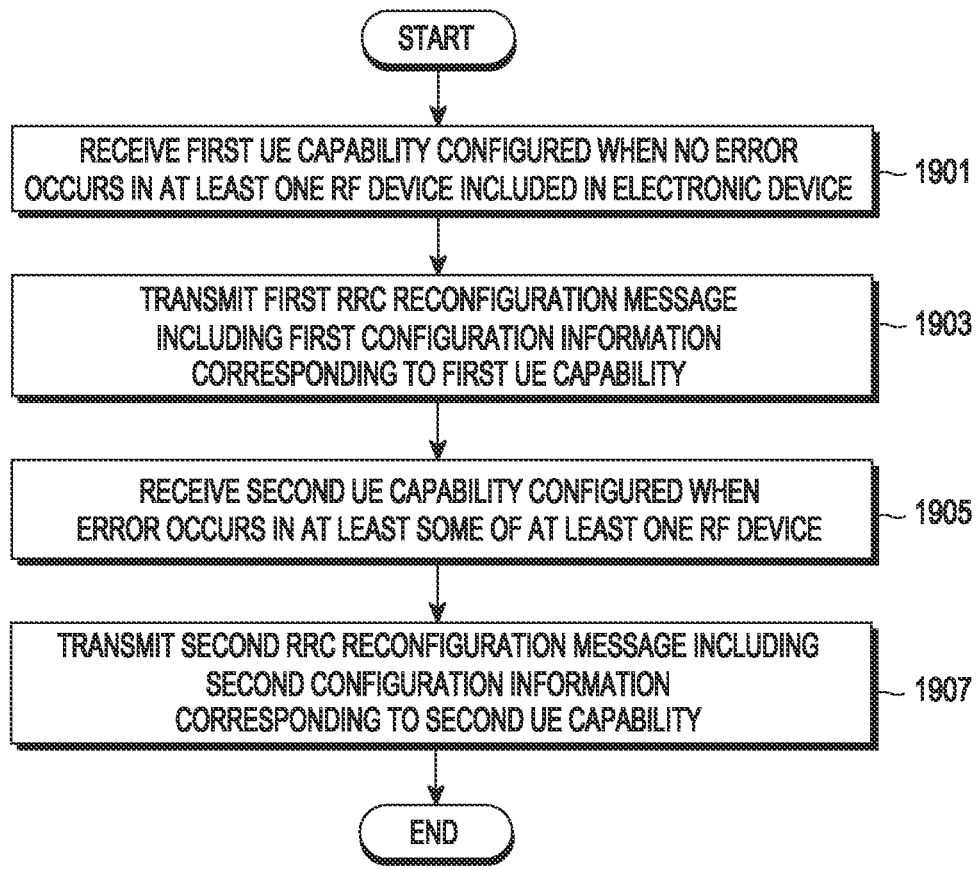
FIG. 19 is a flowchart illustrating an example method of operating a base station according to various embodiments.

FIG. 19 is a flowchart illustrating an example method of operating a base station according to various embodiments.

According to various embodiments, the base station (e.g., at least a portion of the first network 198 or the second network 199) may receive a first UE capability set (e.g., configured) when no error occurs in at least one RF device included in the electronic device 101, in operation 2001. In operation 2003, the base station may transmit a first RRC reconfiguration message (e.g., an RRC reconfiguration message or an RRC connection reconfiguration message) including first configuration information corresponding to the first UE capability to the electronic device.

According to various embodiments, the base station may receive, from the electronic device 101, a second UE capability set (e.g., configured) when an error occurs in at least some of at least one RF device included in the electronic device 101 in operation 2005. In operation 2007, the base station may transmit a second RRC reconfiguration message including second configuration information corresponding to the second UE capability to the electronic device 101.

In an example, the first UE capability including an information element of a frequency band supported in a normal state of the electronic device 101 and/or an information element of a frequency band combination may be transmitted. The base station determines the first configuration information of measurement object (MO) and/or carrier aggregation (CA) configuration based on the information element of the frequency band and/or the information element of the frequency band combination included in the first UE capability. The base station may transmit the first RRC reconfiguration message including the first configuration information to the electronic device 101. The electronic device 101 may perform CA and/or measurement and reporting according to the first configuration information included in the first RRC reconfiguration message. The electronic device 101 may transmit, to the base station, the second UE capability in which the information element of the frequency band combination and/or the information element of the frequency band including at least one frequency corresponding to the error has been deleted and/or modified. The base station may determine second configuration information of MO and/or CA configuration not including at least one frequency corresponding to the error, based on the second UE capability. The base station may transmit the second RRC reconfiguration message including the second configuration information to the electronic device 101. The electronic device 101 may perform CA and/or measurement and reporting according to the second configuration information included in the first RRC reconfiguration message. Accordingly, the electronic device 101 may not perform CA and/or measurement on at least one frequency corresponding to the error.

In an embodiment, a first UE capability including an information element of SRS switching and/or the maximum number of layers supported in the normal state of the electronic device 101 may be transmitted. The base station may determine the first configuration information about the SRS switching configuration of uplink and/or the number of layers of downlink for the electronic device 101 based on the information element of the frequency band combination and/or the information element of the frequency band included in the first UE capability. The base station may transmit the first RRC reconfiguration message including the first configuration information to the electronic device 101. The electronic device 101 may perform a MIMO operation and/or an SRS switching operation according to the first configuration information included in the first RRC reconfiguration message. The electronic device 101 may identify at least one RF path corresponding to an error and may thus transmit, to the base station, the second UE capability in which the information element of SRS switching and/or the maximum number of layers supported has been modified. The base station may determine the second configuration information about the SRS switching configuration of uplink and/or the number of layers of downlink for the electronic device 101 based on the second UE capability. The base station may transmit the second RRC reconfiguration message including the second configuration information to the electronic device 101. The electronic device 101 may perform a MIMO operation and/or an SRS switching operation according to the second configuration information included in the second RRC reconfiguration message.

According to various example embodiments, an electronic device (e.g., the electronic device 101) may comprise: at least one antenna (e.g., at least some of the antennas 341, 342, 343, and 344), a plurality of RF devices (e.g., at least some of the RFIC 310, the first RFFE 331, or the second RFFE 332) configured to perform generation of a transmission radio frequency (RF) signal input to the at least one antenna and/or conversion of a reception RF signal output from the at least one antenna, and at least one processor (e.g., at least some of the processor 120, the first communication processor 212, the second communication processor 214, or the integrated communication processor 260). The at least one processor may be configured to: detect an error in at least one RF device among the plurality of RF devices, identify at least one RF path associated with the at least one RF device with the error and at least one frequency associated with the at least one RF path, adjust a UE capability supported by the electronic device, by modifying and/or deleting an information element associated with the at least one frequency among at least one information element of the UE capability, based on the at least one RF path, and report the adjusted UE capability to a network.

According to various example embodiments, the at least one processor may be configured to, as at least part of adjusting the UE capability, delete a frequency band corresponding to the at least one frequency among frequency bands included in a frequency band list information element supported in the UE capability.

According to various example embodiments, the at least one processor may be configured to, as at least part of deleting the frequency band corresponding to the at least one frequency among the frequency bands included in the frequency band list information element supported in the UE capability, delete the frequency band corresponding to the at least one frequency based on an absence of an RF path supporting the at least one frequency, except for the at least one RF path.

According to various example embodiments, the at least one processor may be configured to, as at least part of adjusting the UE capability, delete and/or modify at least one frequency band combination including the at least one frequency among supported frequency band combinations included in a frequency band combination information element of the UE capability.

According to various example embodiments, the at least one processor may be configured to, as at least part of deleting and/or modifying the at least one frequency band including the at least one frequency, delete a frequency band combination having one frequency band configuration element except for a configuration element of the at least one frequency among the at least one frequency band combination including the at least one frequency.

According to various example embodiments, the at least one processor may be configured to, as at least part of deleting and/or modifying the at least one frequency band including the at least one frequency, perform modification by deleting the at least one frequency from a frequency band combination having a configuration element of two or more frequency bands except for a configuration element of the at least one frequency among the at least one frequency band combination including the at least one frequency.

According to various example embodiments, the at least one processor may be configured to, as at least part of adjusting the UE capability, modify an information element of a number of layers corresponding to the at least one frequency of the UE capability.

According to various example embodiments, the at least one processor may be configured to, as at least part of modifying the information element of the number of layers corresponding to the at least one frequency, determine the number of layers, based on a number of RF paths supporting the at least one frequency, except for the at least one RF path.

According to various example embodiments, the at least one processor may be configured to, as at least part of adjusting the UE capability, modify an information element of a sound reference signal (SRS) transmission port switch corresponding to the at least one frequency of the UE capability.

According to various example embodiments, the at least one processor may be configured to, as at least part of modifying the information element of the SRS transmission port switch corresponding to the at least one frequency, determine the information element of the SRS transmission port switch, based on a number of RF paths supporting the at least one frequency, except for the at least one RF path.

According to various example embodiments, the at least one processor may be configured to, as at least part of reporting the adjusted UE capability to the network, report the adjusted UE capability to the network, using an RF path different from the at least one RF path.

According to various example embodiments, the at least one processor may be configured to, as at least part of detecting the error in the at least one RF device among the plurality of RF devices, perform at least one of receiving information according to a request for information to the at least one RF device, control of a general purpose input output (GPIO), or a reading operation after a writing operation to a register, and detect the error in the at least one RF device based on a result of the performing.

According to various example embodiments, the at least one processor may be configured to, as at least part of detecting the error in the at least one RF device among the plurality of RF devices, determine a first magnitude of a signal corresponding to the at least one RF path corresponding to the at least one RF device, control the at least one RF device to apply the first magnitude of RF signal to the at least one RF path, identify a second magnitude of the RF signal measured on the at least one RF path, and identify an error associated with the at least one RF device based on a difference and/or a ratio between the first magnitude and the second magnitude meeting a designated condition.

According to various example embodiments, the at least one processor may be configured to, as at least part of detecting the error in the at least one RF device among the plurality of RF devices, detect the error in the at least one RF device based on a temperature corresponding to the at least one RF device meeting a designated condition.

According to various example embodiments, a method for operating an electronic device including at least one antenna and a plurality of radio frequency (RF) devices configured to perform generation of a transmission RF signal input to the at least one antenna and/or conversion of a reception RF signal output from the at least one antenna may comprise: detecting an error in at least one RF device among the plurality of RF devices, identifying at least one RF path associated with the at least one RF device with the error and at least one frequency associated with the at least one RF path, adjusting a user equipment (UE) capability supported by the electronic device, by modifying and/or deleting an information element associated with the at least one frequency among at least one information element of the UE capability, based on the at least one RF path, and reporting the adjusted UE capability to a network.

According to various example embodiments, adjusting the UE capability may delete a frequency band corresponding to the at least one frequency among frequency bands included in a frequency band list information element supported in the UE capability.

According to various example embodiments, adjusting the UE capability may delete and/or modify at least one frequency band combination including the at least one frequency among frequency band combinations included in a frequency band combination information element supported in the UE capability.

According to various example embodiments, adjusting the UE capability may modify an information element of a number of layers corresponding to the at least one frequency of the UE capability.

According to various example embodiments, adjusting the UE capability may modify an information element of a sound reference signal (SRS) transmission port switch corresponding to the at least one frequency of the UE capability.

According to various example embodiments, a method for operating a base station may comprise: receiving, from an electronic device, a first user equipment (UE) capability configured when no error occurs in at least one radio frequency (RF) device included in the electronic device, transmitting, to the electronic device, a first radio resource control (RRC) reconfiguration message including first configuration information corresponding to the first UE capability, receiving, from the electronic device, a second UE capability configured based on an error occurring in at least some of the at least one RF device included in the electronic device, and transmitting, to the electronic device, a second RRC reconfiguration message including second configuration information corresponding to the second UE capability.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising,
   at least one antenna;
   a plurality of radio frequency (RF) devices configured to perform generation of a transmission RF signal input to the at least one antenna and/or conversion of a reception RF signal output from the at least one antenna, and
   at least one processor, wherein the at least one processor is configured to:
   detect an error in at least one RF device among the plurality of RF devices,
   identify at least one RF path associated with the at least one RF device with the error and at least one frequency associated with the at least one RF path,
   adjust a user equipment (UE) capability supported by the electronic device, by modifying and/or deleting an information element associated with the at least one frequency among at least one information element of the UE capability based on the at least one RF path, and
   report the adjusted UE capability to a network.

2. The electronic device of claim 1, wherein the at least one processor is configured to, as at least part of adjusting the UE capability,
   delete a frequency band corresponding to the at least one frequency among frequency bands included in a frequency band list information element supported in the UE capability.

3. The electronic device of claim 2, wherein the at least one processor is configured to, as at least part of deleting the frequency band corresponding to the at least one frequency among the frequency bands included in the frequency band list information element supported in the UE capability,
   delete the frequency band corresponding to the at least one frequency, based on an absence of an RF path supporting the at least one frequency except for the at least one RF path.

4. The electronic device of claim 1, wherein the at least one processor is configured to, as at least part of adjusting the UE capability,
   delete and/or modify at least one frequency band combination including the at least one frequency among supported frequency band combinations included in a frequency band combination information element of the UE capability.

5. The electronic device of claim 4, wherein the at least one processor is configured to, as at least part of deleting and/or modifying the at least one frequency band including the at least one frequency,
   delete a frequency band combination having one frequency band configuration element except for a configuration element of the at least one frequency among the at least one frequency band combination including the at least one frequency.

6. The electronic device of claim 4, wherein the at least one processor is configured to, as at least part of deleting and/or modifying the at least one frequency band including the at least one frequency,
   perform modification by deleting the at least one frequency from a frequency band combination having a configuration element of two or more frequency bands except for a configuration element of the at least one frequency among the at least one frequency band combination including the at least one frequency.

7. The electronic device of claim 1, wherein the at least one processor is configured to, as at least part of adjusting the UE capability,
   modify an information element of a number of layers corresponding to the at least one frequency of the UE capability.

8. The electronic device of claim 7, wherein the at least one processor is configured to, as at least part of modifying the information element of the number of layers corresponding to the at least one frequency,
   determine the number of layers, based on a number of RF paths supporting the at least one frequency except for the at least one RF path.

9. The electronic device of claim 1, wherein the at least one processor is configured to, as at least part of adjusting the UE capability,
   modify an information element of a sound reference signal (SRS) transmission port switch corresponding to the at least one frequency of the UE capability.

10. The electronic device of claim 9, wherein the at least one processor is configured to, as at least part of modifying the information element of the SRS transmission port switch corresponding to the at least one frequency,
    determine the information element of the SRS transmission port switch, based on a number of RF paths supporting the at least one frequency, except for the at least one RF path.

11. The electronic device of claim 1, wherein the at least one processor is configured to, as at least part of reporting the adjusted UE capability to the network,
    report the adjusted UE capability to the network using an RF path different from the at least one RF path.

12. The electronic device of claim 1, wherein the at least one processor is configured to, as at least part of detecting the error in the at least one RF device among the plurality of RF devices,
    perform at least one of receiving information according to a request for information to the at least one RF device, control of a general purpose input output (GPIO), or a reading operation after a writing operation to a register, and
    detect the error in the at least one RF device based on a result of the performing.

13. The electronic device of claim 1, wherein the at least one processor is configured to, as at least part of detecting the error in the at least one RF device among the plurality of RF devices,
    determine a first magnitude of a signal corresponding to the at least one RF path corresponding to the at least one RF device,
    control the at least one RF device to apply the first magnitude of RF signal to the at least one RF path,
    identify a second magnitude of the RF signal measured on the at least one RF path, and
    identify an error associated with the at least one RF device based on a difference and/or a ratio between the first magnitude and the second magnitude meeting a designated condition.

14. The electronic device of claim 1, wherein the at least one processor is configured to, as at least part of detecting the error in the at least one RF device among the plurality of RF devices,
    detect the error in the at least one RF device based on a temperature corresponding to the at least one RF device meeting a designated condition.

15. A method of operating an electronic device including at least one antenna and a plurality of radio frequency (RF)

devices configured to perform generation of a transmission RF signal input to the at least one antenna and/or conversion of a reception RF signal output from the at least one antenna, the method comprising, detecting an error in at least one RF device among the plurality of RF devices;

identifying at least one RF path associated with the at least one RF device with the error and at least one frequency associated with the at least one RF path;

adjusting a user equipment (UE) capability supported by the electronic device, by modifying and/or deleting an information element associated with the at least one frequency among at least one information element of the UE capability, based on the at least one RF path, and reporting the adjusted UE capability to a network.

16. The method of claim 15, wherein adjusting the UE capability includes deleting a frequency band corresponding to the at least one frequency among frequency bands included in a frequency band list information element supported in the UE capability.

17. The method of claim 15, wherein adjusting the UE capability includes deleting and/or modifying at least one frequency band combination including the at least one frequency among frequency band combinations included in a frequency band combination information element supported in the UE capability.

18. The method of claim 15, wherein adjusting the UE capability includes modifying an information element of a number of layers corresponding to the at least one frequency of the UE capability.

19. The method of claim 15, wherein adjusting the UE capability includes modifying an information element of a sound reference signal (SRS) transmission port switch corresponding to the at least one frequency of the UE capability.

20. A method of operating a base station, the method comprising, receiving, from an electronic device, a first user equipment (UE) capability configured when no error occurs in at least one radio frequency (RF) device included in the electronic device;

transmitting, to the electronic device, a first radio resource control (RRC) reconfiguration message including first configuration information corresponding to the first UE capability;

receiving, from the electronic device, a second UE capability configured based on an error occurring in at least some of the at least one RF device included in the electronic device, and transmitting, to the electronic device, a second RRC reconfiguration message including second configuration information corresponding to the second UE capability.

\* \* \* \* \*